US012770297B2

(12) United States Patent
Takada et al.

(10) Patent No.: US 12,770,297 B2

(45) Date of Patent: Oct. 20, 2026

(54) 3D DATA CODING APPARATUS AND 3D DATA DECODING APPARATUS

(71) Applicant: SHARP KABUSHIKI KAISHA, Sakai City (JP)

(72) Inventors: Keiichiro Takada, Sakai City (JP); Yasuaki Tokumo, Sakai City (JP); Tomohiro Ikai, Sakai City (JP); Takeshi Chujoh, Sakai City (JP); Tomoko Aono, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 142 days.

(21) Appl. No.: 18/586,717

(22) Filed: Feb. 26, 2024

(65) Prior Publication Data

US 2024/0420378 A1 Dec. 19, 2024

(30) Foreign Application Priority Data

Jun. 14, 2023 (JP) ................................ 2023-097460

(51) Int. Cl.
*G06T 9/00* (2006.01)

(52) U.S. Cl.
CPC .............. *G06T 9/002* (2013.01); *G06T 9/001* (2013.01)

(58) Field of Classification Search
CPC ......... G06T 9/002; G06T 9/001; H04N 19/70; H04N 19/597; H04N 19/172; H04N 19/186; H04N 19/42; H04N 19/46
See application file for complete search history.

(56) References Cited

U.S. PATENT DOCUMENTS

2020/0221125 A1* 7/2020 Budagavi ............. H04N 19/172
2022/0337859 A1* 10/2022 Iguchi .................. H04N 19/136

OTHER PUBLICATIONS

Graziosi et al. "An overview of ongoing point cloud compression standardization activities: video-based (V-PCC) and geometry-based (G-PCC)", Mar. 9, 2020, Published by Cambridge University Press (Year: 2020).*

Akhtar et al. "Video-Based Point Cloud Compression Artifact Removal", Jun. 17, 2021, Published on IEEE Xplore, https://doi.org/10.1109/TMM.2021.3090148 (Year: 2021).*

"Information technology—Multimedia content description interface—Part 17: Compression of neural networks for multimedia content description and analysis", Publication date : Aug. 2022, ISO/IEC 15938-17:xxxx(E), ISO JTC 1/SC 29/WG 11, Secretariat: JISC.

(Continued)

*Primary Examiner* — Kee M Tung
*Assistant Examiner* — Thang Gia Huynh
(74) *Attorney, Agent, or Firm* — ScienBiziP, P.C.

(57) ABSTRACT

A 3D data decoding apparatus for decoding coded data and decoding 3D data including attribute information includes a header decoder that decodes characteristics information of refinement and activation information of the refinement, and a refiner that performs refinement processing of an attribute frame or an geometry frame. Refinement target information indicating which of an occupancy, a geometry, or an attribute is to be used is decoded from coded data of the characteristics information and the refinement is performed using an image specified according to the refinement target information.

10 Claims, 19 Drawing Sheets

(56) References Cited

OTHER PUBLICATIONS

"Information technology—Coded representation of immersive media—Part 29: Video-based dynamic mesh coding (V-DMC)", Date: Feb. 10, 2023, ISO 23090-29:2023(E), ISO/IEC JTC 1/SC 29/WG 7.
"Information technology—Coded representation of immersive media—Part 12: MPEG Immersive video", Publication date : Aug. 2023, ISO/IEC!23090-12:2021(E)/AMD. 1:2022, ISO/IEC JTC 1/SC 29, Secretariat:!JISC.
"Information technology—Coded representation of immersive media—Part 5: Visual volumetric video-based coding (V3C) and video-based point cloud compression (V-PCC)", Date: Feb. 1, 2023, ISO/IEC 23090-5:2023(E), ISO/IEC JTC 1/SC 29/WG 07, Secretariat: AFNOR (France).
Keiichiro Takada et al., "[V-PCC] [EE2.8] V3C neural-network post-filter SEI messages", Online—Jan. 2023, ISO/IEC JTC 1/SC 29/WG 7 m61805.
Keiichiro Takada et al, "[V-PCC] [EE2.8] V3C neural-network post-filter SEI messages", International Organisation for Standardisation Organisation Internationale De Normalisation ISO/IEC JTC 1/SC 29/WG 7 Coding of Moving Pictures and Audio, ISO/IEC JTC 1/SC 29/WG 7 No. m62638 v2, Antalya, [retrieved on Apr. 23, 2023], Apr. 24, 2023-Apr. 28, 2023.

* cited by examiner

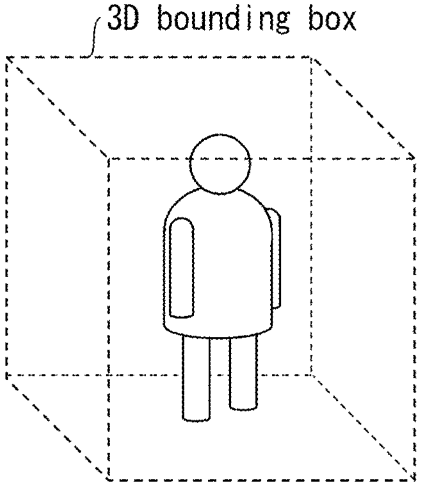
FIG. 3A 3D DATA (POINT CLOUD)
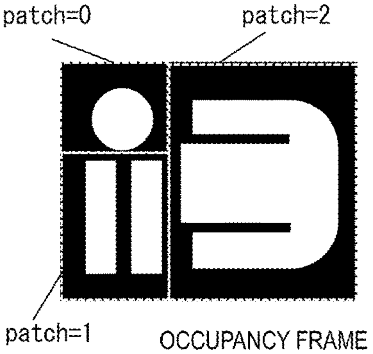
FIG. 3B
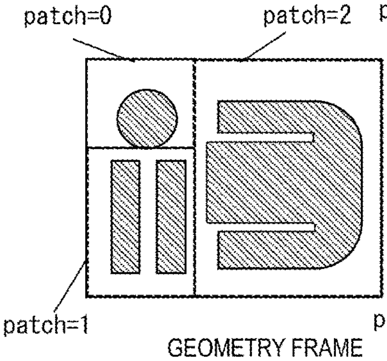
FIG. 3C (mapIdx=0)
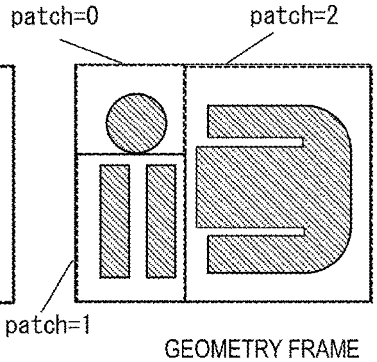
FIG. 3D (mapIdx=1)
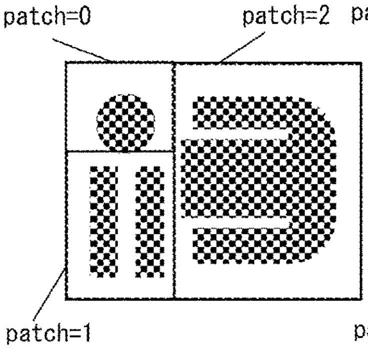
FIG. 3E (mapIdx=0)
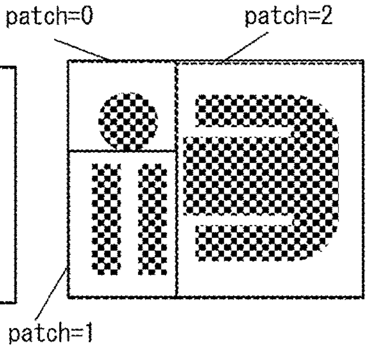
FIG. 3F (mapIdx=1)

| nn_refinement_characteristics( payloadSize ) { | Descriptor |
|---|---|
| **nnrc_purpose** | u(16) |
| **nnrc_id** | ue(v) |
| **nnrc_mode_idc** | ue(v) |
| if( nnrc_mode_idc == 1 ) { | |
| while( !byte_aligned( ) ) | |
| **nnrc_reserved_zero_bit_a** | u(1) |
| **nnrc_tag_uri** | st(v) |
| **nnrc_uri** | st(v) |
| } | |
| **nnrc_property_present_flag** | u(1) |
| if( nnrc_property_present_flag ) { | |
| **nnrc_base_flag** | u(1) |
| **nnrc_input_mode** | ue(v) |
| **nnrc_block_size_idc** | ue(v) |
| **nnrc_overlap_idc** | ue(v) |
| **nnrc_auxiliary_inp_idc** | ue(v) |
| **nnrc_inp_out_format_idc** | ue(v) |
| if (nnrc_inp_out_format_idc) { | |
| **nnrc_inp_tensor_bitdepth_minus8** | ue(v) |
| **nnrc_out_tensor_bitdepth_minus8** | ue(v) |
| } | |
| nnrc_complexity_info() | |
| } | |
| | |
| /* ISO/IEC 15938-17 bitstream */ | |
| if( nnrc_mode_idc == 0 ) { | |
| while( !byte_aligned( ) ) | |
| **nnrc_reserved_zero_bit_b** | u(1) |
| for( i = 0; more_data_in_payload( ); i++ ) | |
| **nnrc_payload_byte[ i ]** | b(8) |
| } | |
| } | |

FIG. 11

| nnrc_input_mode | occupancy | geometry | attribute |
|---|---|---|---|
| 0 | reserved | | |
| 1 | – | – | Y |
| 2 | – | Y | – |
| 3 | – | Y | Y |
| 4 | Y | – | – |
| 5 | Y | – | Y |
| 6 | Y | Y | – |
| 7 | Y | Y | Y |
| 8-15 | reserved | | |

FIG. 12

FIG. 13A

| nn_refinement_characteristics( payloadSize ) { | Descriptor |
|---|---|
| **nnrc_purpose** | u(16) |
| **nnrc_id** | ue(v) |
| **nnpfc_mode_idc** | ue(v) |
| … | |
| **nnpfc_property_present_flag** | u(1) |
| if( nnpfc_property_present_flag ) { | |
| **nnpfc_base_flag** | u(1) |
| **nnrc_input_mode** | ue(v) |
| if (AttributeUsedFlag) | |
| **nnrc_attribute_num_minus1** | ue(v) |
| **…** | |
| nnrc_complexity_info() | |
| } | |
| … | |
| } | |

FIG. 13B

| nn_refinement_characteristics( payloadSize ) { | Descriptor |
|---|---|
| **nnrc_purpose** | u(16) |
| **nnrc_id** | ue(v) |
| **nnpfc_mode_idc** | ue(v) |
| … | |
| **nnpfc_property_present_flag** | u(1) |
| if( nnpfc_property_present_flag ) { | |
| **nnpfc_base_flag** | u(1) |
| **nnrc_input_mode** | ue(v) |
| if (AttributeUsedFlag) { | |
| **nnrc_attribute_start_pos** | ue(v) |
| **nnrc_attribute_num_minus1** | ue(v) |
| } | |
| … | ue(v) |
| nnrc_complexity_info() | |
| } | |
| … | |
| } | |

| nn_refinement_characteristics( payloadSize ) { | Descriptor |
|---|---|
| **nnrc_purpose** | u(16) |
| **nnrc_id** | ue(v) |
| **nnpfc_mode_idc** | ue(v) |
| … | |
| **nnpfc_property_present_flag** | u(1) |
| if( nnpfc_property_present_flag ) { | |
| **nnpfc_base_flag** | u(1) |
| **nnrc_occupancy_flag** | u(1) |
| **nnrc_geometry_flag** | u(1) |
| **nnrc_attribute_num** | u(2) |
| **…** | |
| nnrc_complexity_info() | |
| } | |
| … | |
| } | |

FIG. 14

| nn_refinement_characteristics( payloadSize ) { | Descriptor |
|---|---|
| **nnrc_purpose** | u(16) |
| **nnrc_id** | ue(v) |
| **nnpfc_mode_idc** | ue(v) |
| … | |
| **nnpfc_property_present_flag** | u(1) |
| if( nnpfc_property_present_flag ) { | |
| **nnpfc_base_flag** | u(1) |
| **nnrc_occupancy_flag** | u(1) |
| **nnrc_geometry_flag** | u(1) |
| **nnrc_attribute_num** | u(2) |
| if (nnrc_geometry_flag \|\| nnrc_attribute_num) | |
| **nnrc_map_index** | u(4) |
| if (nnrc_attribute_num) { | |
| **nnrc_attribute_index** | u(4) |
| **nnrc_attribute_partition_index** | u(4) |
| **nnrc_auxiliary_video_flag** | u(4) |
| } | |
| … | |
| nnrc_complexity_info() | |
| } | |
| … | |
| } | |

FIG. 15

FIG. 16A

| nn_refine_activation( payloadSize ) { | **Descriptor** |
|---|---|
| **nnra_target_id** | ue(v) |
| **nnra_cancel_flag** | u(1) |
| if (nnra_cancel_flag != 0) { | |
| **nnra_persistence_flag** | u(1) |
| } | |
| **nnra_strength_idc** | u(6) |
| } | |

FIG. 16B

| nn_refine_activation( payloadSize ) { | **Descriptor** |
|---|---|
| **nnra_target_id** | ue(v) |
| **nnra_cancel_flag** | u(1) |
| if (nnra_cancel_flag != 0) { | |
| **nnra_persistence_flag** | u(1) |
| **nnra_map_index** | u(4) |
| **nnra_attribute_index** | u(4) |
| **nnra_auxiliary_video_flag** | |
| **nnra_strength_idc** | u(6) |
| } | |
| } | |

| nn_refine_activation( payloadSize ) { | **Descriptor** |
|---|---|
| **nnra_attribute_count** | u(7) |
| **nnra_map_count_minus1** | u(4) |
| for( i = 0; i < nnra_attribute_count; i++ ) { | |
| for( j = 0; j < nnra_map_count_minus1+1; j++ ) { | |
| **nnra_enabled_flag[ i ] [ j ]** | u(1) |
| if ( nnra_enabled_flag[ i ] [ j ]) { | |
| **nnra_target_id**[ i ] [ j ] | ue(v) |
| **nnra_cancel_flag**[ i ][ j ] | u(1) |
| if ( !nnra_cancel_flag[ i ][ j ]) { | |
| **nnra_persistence_flag** [ i ][ j ] | u(1) |
| **nnra_strength_present_flag** [ i ][ j ] | u(1) |
| if ( nnra_streangth _present_flag [ i ][ j ] ) | |
| **nnra_strength_idc**[ i ] [ j ] | u(3) |
| **nnra_weight_block_size_idx**[ i ] [ j ] | u(3) |
| if ( nnra_weight_size_idx[ i ] [ j ]) { | |
| **nnra_weight_map_width_minus1**[ i ] [ j ] | u(6) |
| **nnra_weight_map_height_minus1**[ i ] [ j ] | u(6) |
| } | |
| for ( yIdx = 0; yIdx < nnra_weight_map_height[ i ] + 1; yIdx++ ) { | |
| for ( xIdx = 0; xIdx < nnra_weight_map_width[ i ] + 1; xIdx++) { | |
| **nnra_weight_map**[ i ][ j ][ yIdx ][ xIdx ] | u(3) |
| } | |
| } | |
| } | |
| } | |
| } | |
| } | |

FIG. 19

3D DATA CODING APPARATUS AND 3D DATA DECODING APPARATUS

RELATED APPLICATIONS

This application claims the benefit of Japanese Patent Application No. 2023-097460, filed on Jun. 14, 2023, which is hereby incorporated by reference in its entirety.

TECHNICAL FIELD

Embodiments of the present invention relate to a 3D data coding apparatus and a 3D data decoding apparatus.

BACKGROUND ART

A 3D data coding apparatus that converts 3D data into a two-dimensional image and encodes it using a video coding scheme to generate coded data and a 3D data decoding apparatus that decodes and reconstructs a two-dimensional image from the coded data to generate 3D data are provided to efficiently transmit or record 3D data. Also, there is a technique for filtering a two-dimensional image using supplemental enhancement information of a deep learning post-filter.

Specific 3D data coding schemes include, for example, MPEG-I ISO/IEC 23090-5 Visual Volumetric Video-based Coding (V3C) and Video-based Point Cloud Compression (V-PCC). V3C is used to encode and decode a point cloud including point positions and attribute information. V3C is also used to encode and decode multi-view videos and mesh videos through ISO/IEC 23090-12 (MPEG Immersive Video (MIV)) and ISO/IEC 23090-29 (Video-based Dynamic Mesh Coding (V-DMC)) that is currently being standardized. According to Supplemental Enhancement Information (SEI) of a neural network post-filter in NPL 1, neural network model information is transmitted using characteristics SEI to call a frame specified by activation SEI, whereby adaptive filter processing can be performed on point cloud data.

CITATION LIST

Non-Patent Literature

NPL 1:
K. Takada, Y. Tokumo, T. Chujoh. T. Ikai, "[V-PCC] [EE2.8] V3C neural-network post-filter SEI messages," ISO/IEC JTC 1/SC 29/WG7, m61805, January 2023

SUMMARY OF INVENTION

Technical Problem

In NPL 1, there is a problem that filter processing using the relationship between occupancies, geometries, and attributes cannot be performed because filter processing is performed only on attributes. Namely, refinement using information between images is not possible in a method of decoding 3D data using a plurality of images/videos.

It is an object of the present invention to solve the above problem in 3D data encoding and/or decoding using a video coding/decoding scheme, to further reduce coding distortion using auxiliary information of refinement, and to encode and/or decode 3D data with high quality.

Solution to Problem

A 3D data decoding apparatus according to an aspect of the present invention to solve the above problem is a 3D data decoding apparatus for decoding coded data and decoding 3D data including a geometry and an attribute, the 3D data decoding apparatus including a refinement information decoder configured to decode characteristics information of refinement and activation information of refinement from the coded data, a geometry decoder configured to decode a geometry frame from the coded data, an attribute decoder configured to decode an attribute frame from the coded data, and a refiner configured to perform refinement processing of the attribute frame or the geometry frame, wherein the refinement information decoder is configured to decode refinement target information indicating which of an occupancy, a geometry, or an attribute is to be used from coded data of the characteristics information and perform refinement using an image specified according to the refinement target information.

Advantageous Effects of Invention

According to an aspect of the present invention, it is possible to reduce distortion caused by encoding a color image and to encode and/or decode 3D data with high quality.

BRIEF DESCRIPTION OF DRAWINGS

FIGS. 3A to 3F are diagrams for explaining 3D data, an occupancy, a geometry frame, and an attribute frame.

FIG. 11 shows a syntax of characteristics SEI.

FIG. 12 is a diagram showing an example of refinement target information.

FIGS. 13A and 13B show a part of a syntax of characteristics SEI.

FIG. 14 shows a part of a syntax of characteristics SEI.

FIG. 15 shows a part of a syntax of characteristics SEI.

FIGS. 16A and 16B show an example configuration of a syntax of activation SEI.

FIG. 19 shows an example configuration of a syntax of activation SEI.

DESCRIPTION OF EMBODIMENTS

Embodiments of the present invention will be described below with reference to the drawings.

Figure 1:
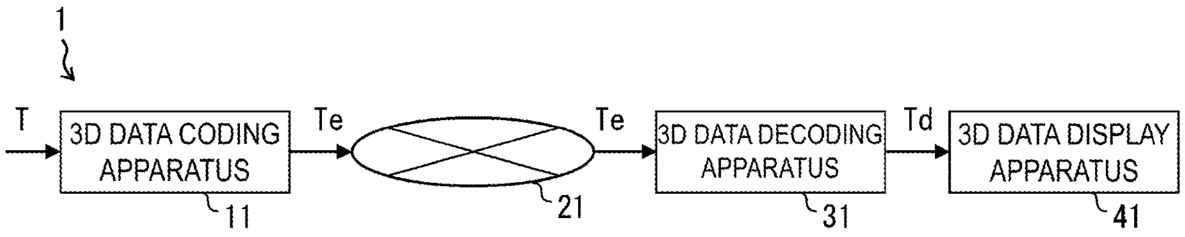
FIG. 1 is a schematic diagram illustrating a configuration of a 3D data transmission system according to the present embodiment.

FIG. 1 is a schematic diagram illustrating a configuration of a 3D data transmission system 1 according to the present embodiment.

The 3D data transmission system 1 is a system that transmits a coding stream obtained by encoding 3D data to be coded, decodes the transmitted coding stream, and displays 3D data. The 3D data transmission system 1 includes a 3D data coding apparatus 11, a network 21, a 3D data decoding apparatus 31, and a 3D data display apparatus 41.

3D data T is input to the 3D data coding apparatus 11.

The network 21 transmits a coding stream Te generated by the 3D data coding apparatus 11 to the 3D data decoding apparatus 31. The network 21 is the Internet, a Wide Area Network (WAN), a Local Area Network (LAN), or a combination thereof. The network 21 is not necessarily a bidirectional communication network and may be a unidirectional communication network that transmits broadcast waves for terrestrial digital broadcasting, satellite broadcasting, or the like. The network 21 may be replaced by a storage medium on which the coding stream Te is recorded, such as a Digital Versatile Disc (DVD) (trade name) or a Blu-ray Disc (BD) (trade name).

The 3D data decoding apparatus 31 decodes each coding stream Te transmitted by the network 21 and generates one or more pieces of decoded 3D data Td.

The 3D data display apparatus 41 displays all or some of one or more pieces of decoded 3D data Td generated by the 3D data decoding apparatus 31. The 3D data display apparatus 41 includes a display device such as, for example, a liquid crystal display or an organic electro-luminescence (EL) display. Examples of display types include stationary, mobile, and HMD. The 3D data display apparatus 41 displays a high quality image in a case that the 3D data decoding apparatus 31 has high processing capacity and displays an image that does not require high processing or display capacity in a case that it has only lower processing capacity.

Operators

Operators used herein will be described below.

">>" is a right bit shift, "<<" is a left bit shift, "&" is a bitwise AND, "|" is a bitwise OR, "|=" is an OR assignment operator, and "||" indicates a logical sum.

"x? y:z" is a ternary operator that takes y if x is true (not 0) and z if x is false (0).

"y . . . z" indicates an ordered set of integers from y to z.

"Floor (a)" is a function that returns the largest integer less than or equal to a.

Structure of Coding Stream Te

A data structure of the coding stream Te generated by the 3D data coding apparatus 11 and decoded by the 3D data decoding apparatus 31 will be described.

Figure 2:
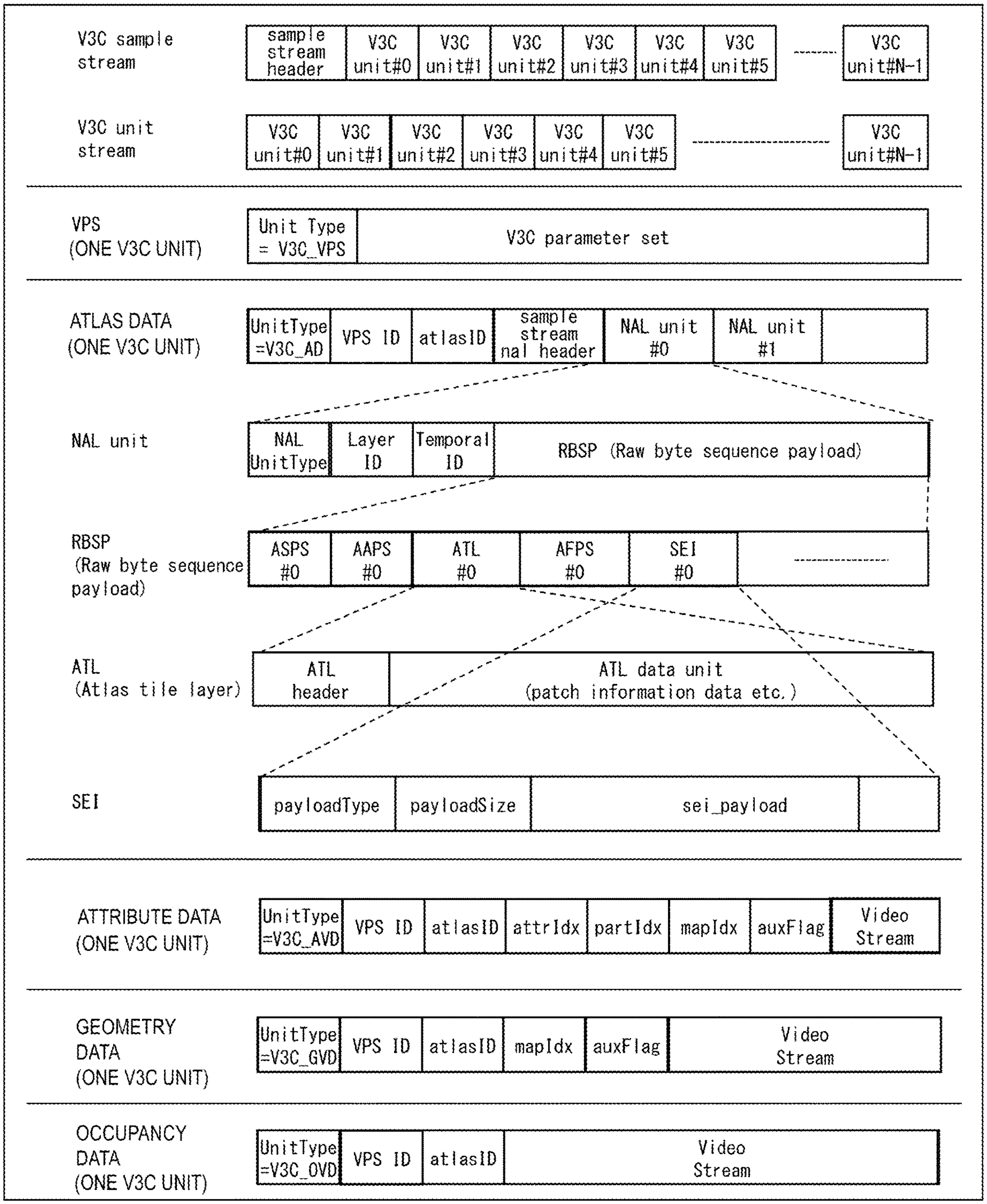
FIG. 2 is a diagram illustrating a hierarchical structure of data of a coding stream.

FIG. 2 is a diagram illustrating a hierarchical structure of data of the coding stream Te. The coding stream Te has a data structure of either a V3C sample stream or a V3C unit stream. A V3C sample stream includes a sample stream header and V3C units and a V3C unit stream includes V3C units.

Each V3C unit includes a V3C unit header and a V3C unit payload. A header of a V3C unit (=V3C unit header) is a Unit Type which is an ID indicating the type of the V3C unit and has a value indicated by a label such as V3C_VPS, V3C_AD, V3C_AVD, V3C_GVD, or V3C_OVD.

In a case that the Unit Type is a V3C_VPS (Video Parameter Set), the V3C unit payload includes a V3C parameter set.

In a case that the Unit Type is V3C_AD (Atlas Data), the V3C unit payload includes a VPS ID, an atlas ID, a sample stream NAL header, and a plurality of NAL units. ID is an abbreviation for identification and has an integer value of 0 or more. This atlas ID may be used as an element of activation SEI.

Each NAL unit includes a NALUnitType, a layerID, a TemporalID, and a Raw Byte Sequence Payload (RBSP).

A NAL unit is identified by NALUnitType and includes an Atlas Sequence Parameter Set (ASPS), an Atlas Adaptation Parameter Set (AAPS), an Atlas Tile Layer (ATL), Supplemental Enhancement Information (SEI), and the like.

The ATL includes an ATL header and an ATL data unit and the ATL data unit includes information on positions and sizes of patches or the like such as patch information data.

The SEI includes a payloadType indicating the type of the SEI, a payloadSize indicating the size (number of bytes) of the SEI, and an sei_payload which is data of the SEI.

In a case that the UnitType is V3C_AVD (Attribute Video Data, attribute data), the V3C unit payload includes a VPS ID, an atlas ID, an attrIdx which is an attribute frame ID (whose syntax name is a vuh_attribute_index), a partIdx which is a partition ID (vuh_attribute_partition_index), a mapIdx which is a map ID (vuh_map_index), a flag auxFlag (vuh_auxiliary_video_flag) indicating whether the data is auxiliary data, and a video stream. The video stream indicates data such as HEVC and VVC.

In a case that the UnitType is V3C_GVD (Geometry Video Data, geometry data), the V3C unit payload includes a VPS ID, an atlas ID, a mapIdx, an auxFlag, and a video stream.

In a case that the UnitType is V3C_OVD (Occupancy Video Data, occupancy data), the V3C unit payload includes a VPS ID, an atlas ID, and a video stream.

Data Structure of Three-Dimensional Stereoscopic Information

Three-dimensional stereoscopic information (3D data) in the present specification is a set of position information (x, y, z) and attribute information in a three-dimensional space. For example, 3D data is expressed in the format of a point cloud that is a group of points with position information and attribute information in a three-dimensional space or a mesh having triangle (or polygon) vertices and faces.

FIGS. 3A to 3F are diagrams for explaining 3D data, an occupancy frame (a two-dimensional image representing occupancy information which is hereinafter referred to as an occupancy frame), a geometry frame (a two-dimensional image representing depth or position information which is hereinafter referred to as a geometry frame), and an attribute frame (a two-dimensional image representing attribute information which is hereinafter referred to as an attribute frame). A point cloud and a mesh that constitute the 3D data are divided into a plurality of parts (regions) by the 3D data coding apparatus 11 and a point cloud included in each part is projected onto a plane of a 3D bounding box set in a 3D space (FIG. 3A). The 3D data coding apparatus 11 generates a plurality of patches from the projected point cloud. Information regarding the 3D bounding box (such as coordinates and sizes) and information regarding mapping to the projection planes (such as the projection planes, coordinates, sizes, and presence or absence of rotation of each patch) are referred to as atlas information. An occupancy frame is a two-dimensional image showing valid areas of patches (areas where a point cloud or a mesh exists) as a 2D binary image (e.g., with 1 for a valid area and 0 for an invalid area) (FIG. 3B). Here, values other than 0 and 1 such as 255 and 0 may be used as the values of the valid and invalid areas. A geometry frame is a two-dimensional image showing the depth values (distances) of patches with respect to the projection plane (FIGS. 3C and 3D). The relationship between the depth values and the pixel values may be linear or the distances may be derived from the pixel values using a lookup table, a mathematical formula, or a relational formula based on a combination of branches based on values. An attribute frame is a two-dimensional image showing attribute information (e.g., RGB colors) of points (FIGS. 3E and 3F). Even with projection in the same direction, the depths (distant and near views) of an object surface may differ and a mapIdx indicates which depth of projection is performed.

Each of the occupancy frames, geometry frames, attribute frames, and atlas information may be an image obtained by mapping (packing) partial images (patches) from different projection planes onto a certain two-dimensional image. The atlas information includes information on the number of patches and the projection planes corresponding to the patches. The 3D data decoding apparatus 31 reconstructs the coordinates and attribute information of a point cloud or a mesh from the atlas information, the occupancy frame, the geometry frame, and the attribute frame. Here, points are points of a point cloud or vertices of a mesh. Instead of the occupancy frame and the geometry frame, mesh information (position information) indicating the vertices of the mesh may be encoded, decoded, and transmitted. Mesh information may also be encoded, decoded, and transmitted after being divided into a base mesh that forms a basic mesh that is a subset of the mesh and a mesh displacement. The mesh displacement indicates a displacement from the base mesh to indicate a mesh part other than the basic mesh.

Terms

Atlas: A collection of 2D bounding boxes and their related information arranged in a rectangular frame, the collection corresponding to a volume in 3D space on which volumetric data is rendered.

Attribute: A scalar or vector property optionally associated with each point in a volumetric frame such as a color, a reflectance, a surface normal, a transparency, or a material ID.

Attribute frame: A two-dimensional rectangular array created as a collection of patches containing the values of specific attributes.

Attribute map: An attribute frame containing attribute patch information projected to a specific depth indicated by a corresponding geometry map.

Bitstream: An ordered series of bits that forms a coded representation of data, or coded data.

Coded Atlas Sequence (CAS): A sequence of coded atlas access units (AUs), in decoding order, of an IRAP coded atlas AU of NoOutputBeforeRecoveryFlag equal to 1, followed by zero or more coded atlas AUs that are not IRAP coded atlas AUs of NoOutputBeforeRecoveryFlag equal to 1. Here, the zero or more coded atlas AUs include all subsequent coded atlas AUs up to, but not including, a subsequent IRAP coded atlas access unit of NoOutputBeforeRecoveryFlag equal to 1.

An IRAP coded atlas AU may be any of an instantaneous decoding refresh (IDR) coded access unit, a Broken Link Access (BLA) coded access unit, or a Clean Random Access (CRA) coded access unit.

Geometry: A set of Cartesian coordinates relating to a volumetric frame.

Geometry frame: A 2D array created by aggregating geometry patch information relating to each patch.

Geometry map: A geometry frame containing geometry patch information projected to a specific depth.

Occupancy: A value that indicates whether an atlas sample corresponds to a related sample in 3D space.

Occupancy frame: A collection of occupancy values forming a 2D array, the collection representing all occupancies of an atlas frame.

Patch: A rectangular region relating to volumetric information within an atlas.

Overview of Characteristics SEI and Activation SEI

Figure 4A:
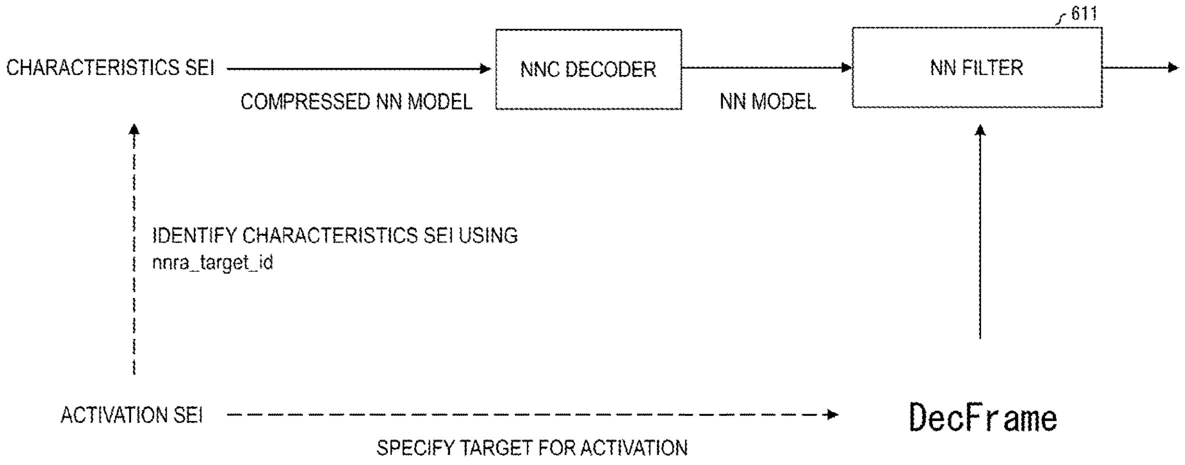
FIGS. 4A and 4B are diagrams illustrating a relationship between characteristics SEI and activation SEI according to an embodiment of the present invention.

FIG. 4A illustrates a relationship between refinement characteristics SEI (hereinafter referred to as characteristics SEI, nn_refinement_characteristics SEI, NNRC_SEI, or characteristics information) and refinement activation SEI (hereinafter referred to as activation SEI, nn_refinement_activation SEI, NNRA_SEI, activation SEI, or activation information) according to an embodiment of the present invention. The NNC decoder decodes a compressed neural network (NN) model transmitted in characteristics SEI to derive an NN model. MPEG Neural Network Coding (ISO/IEC 15938-19) may be used to encode and decode an NN model. The refiner 306 includes an NN filter 611 and the NN filter 611 performs filter processing using the derived NN model. Details of the NN filter 611 will be described later. The characteristics SEI used for refinement is specified by a syntax element, for example an nnra_target_id, of the activation SEI. The activation SEI transmits persistence information using a syntax element and specifies that filter processing is to be performed on an attribute frame during a persistence specified by the persistence information. The NN filter 611 may also include the NNC decoder. The activation SEI (activation information) is not limited to the SEI shown in FIGS. 16A and 16B and may be data including NAL units or atlas data.

Figure 4B:
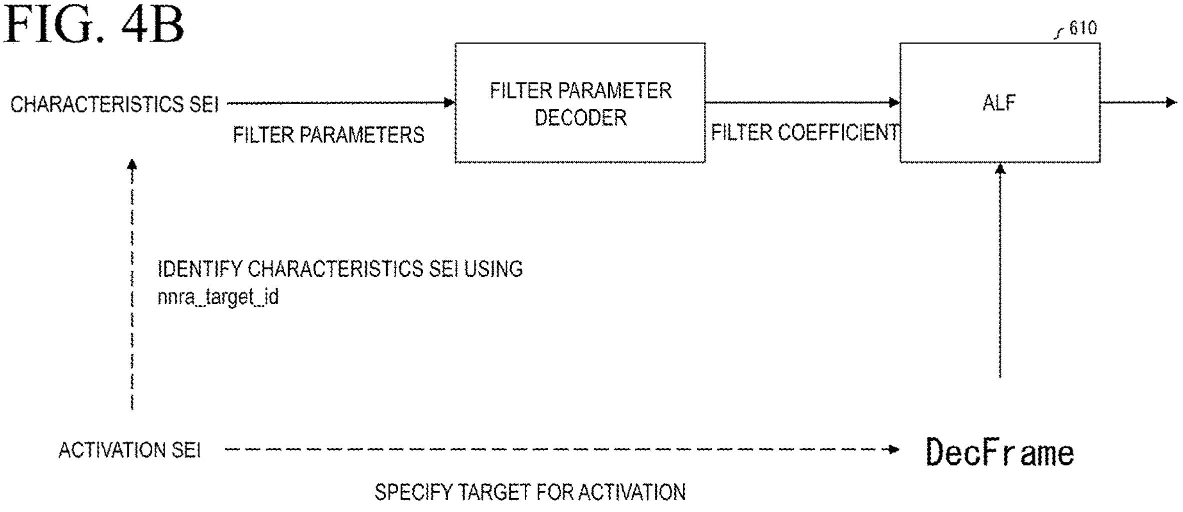

FIG. 4B is another diagram illustrating a relationship between refinement characteristics SEI and refinement activation SEI according to an embodiment of the present invention. The refiner 306 includes a linear filter (ALF) 610. A filter parameter decoder decodes a syntax of filter parameters transmitted in characteristics SEI to derive coefficients of the linear filter. The filter is not limited to a loop filter and may be a post-filter. Also, although the filter is described as linear, it may include nonlinear elements such as simple clips and square components. The ALF 610 performs filter processing on an attribute frame or a geometry frame using the derived linear model.

Configuration of 3D Data Decoding Apparatus

Figure 5:
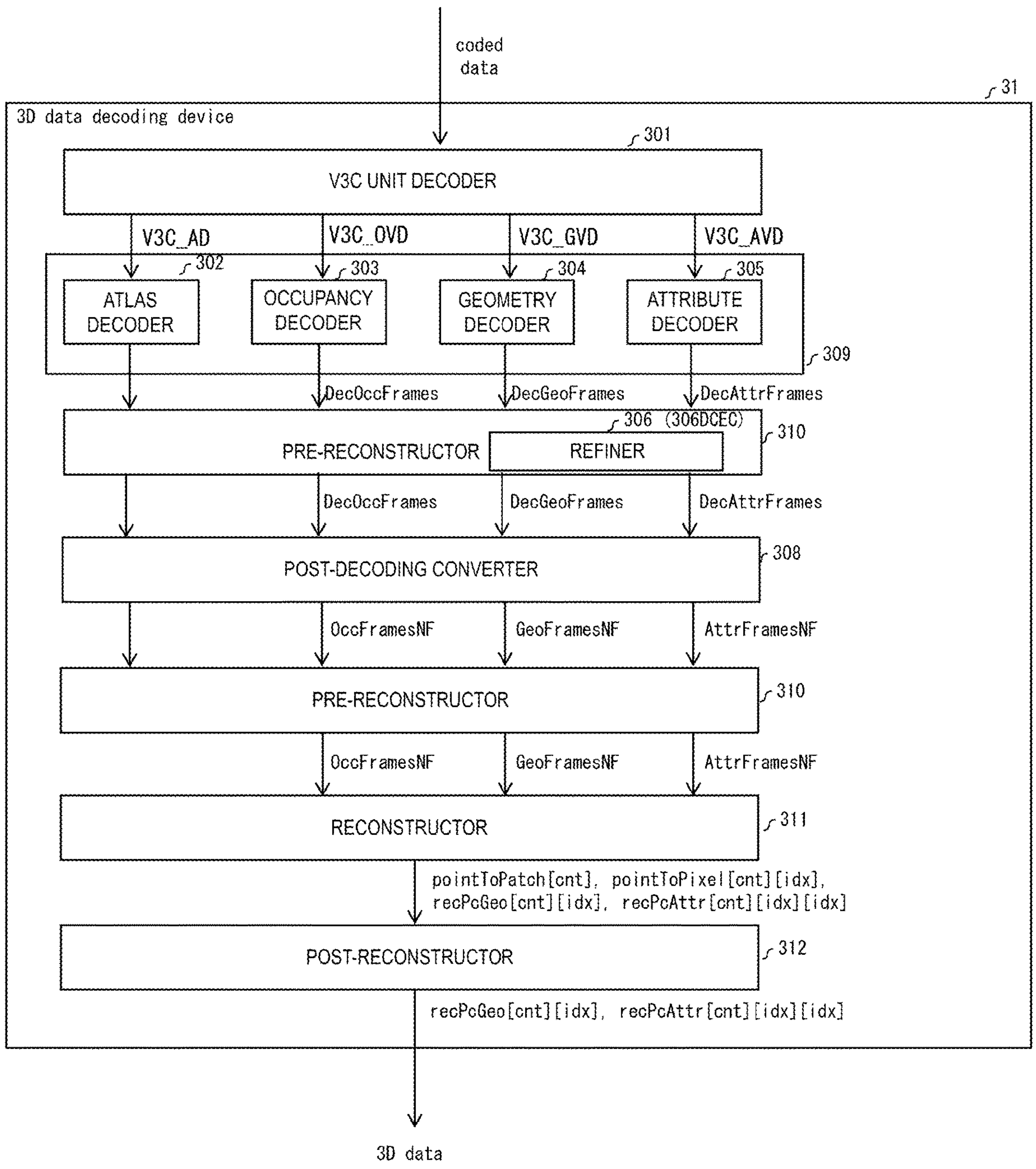
FIG. 5 is a functional block diagram illustrating a schematic configuration of a 3D data decoding apparatus 31 according to an embodiment of the present invention.
Figure 7:
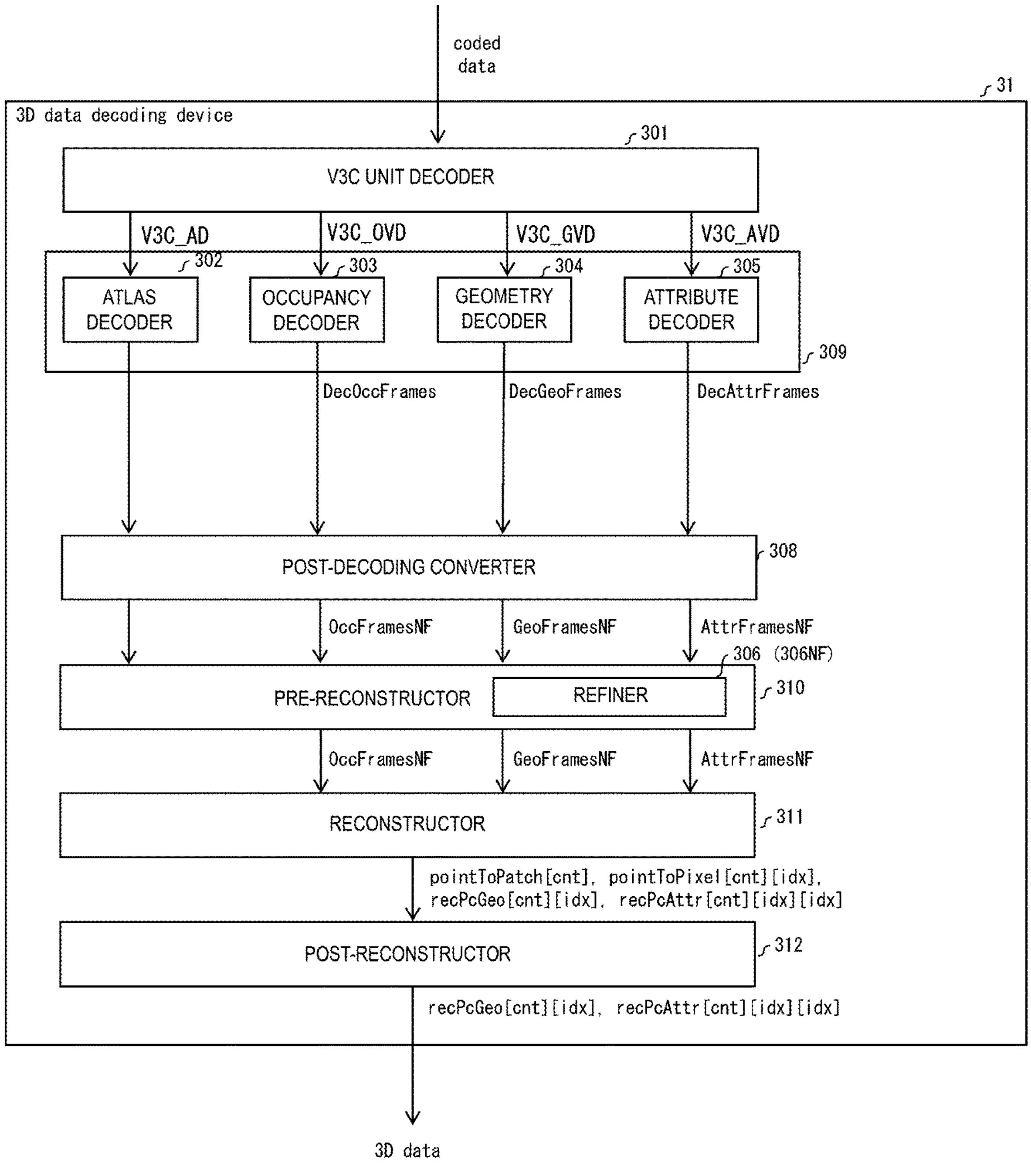
FIG. 7 is a functional block diagram illustrating a schematic configuration of a 3D data decoding apparatus 31 according to an embodiment of the present invention.

FIGS. 5 and 7 are functional block diagrams illustrating a schematic configuration of the 3D data decoding apparatus 31 according to an embodiment of the present invention.

The 3D data decoding apparatus 31 includes a V3C unit decoder 301, an atlas decoder 302 (a refinement information decoder), an occupancy decoder 303, a geometry decoder 304, an attribute decoder 305, a post-decoding converter 308, a pre-reconstructor 310, a reconstructor 311, and a post-reconstructor 312.

The V3C unit decoder 301 receives coded data (a bitstream) such as that of a byte stream format or an ISO Base Media File Format (ISOBMFF) and decodes a V3C unit header and a V3C VPS. The V3C unit decoder 301 selects the atlas decoder 302, the occupancy decoder 303, the geometry decoder 304, or the attribute decoder 305 according to the UnitType of the V3C unit header. The V3C unit decoder 301 uses the atlas decoder 302 in a case that the UnitType is V3C_AD and uses the occupancy decoder 303, the geometry decoder 304, or the attribute decoder 305 to decode an occupancy frame, a geometry frame, or an attribute frame in a case that the UnitType is V3C_OVD, V3C_GVD, or V3C_AVD.

The atlas decoder 302 receives atlas data and decodes atlas information.

The atlas decoder 302 (a refinement information decoder) decodes characteristics SEI indicating characteristics of refinement processing from coded data. The refinement information decoder decodes information on a target to which refinement is to be applied (refinement target information). Further, the atlas decoder 302 decodes activation SEI from the coded data.

The atlas decoder 302 decodes an identifier atlasID indicating target atlas information indicating a refinement target from a V3C unit including the activation SEI.

The occupancy decoder 303 decodes occupancy data encoded using VVC, HEVC, or the like and outputs an occupancy frame DecOccFrames[frameIdx][compIdx][y][x]. Here, DecOccFrames, frameIdx, compIdx, y, and x respectively indicate a decoded occupancy frame, a frame ID, a component ID, a row index, and a column index. In DecOccFrames, compIdx=0 may be set.

The geometry decoder 304 decodes geometry data encoded using VVC, HEVC, or the like and outputs a geometry frame DecGeoFrames[mapIdx][frameIdx][compIdx][y][x]. Here, DecGeoFrames, frameIdx, mapIdx, compIdx, y, and x respectively indicate a decoded geometry frame, a frame ID, a map ID, a component ID, a row index, and a column index. DecGeoBitDepth, DecGeoHeight, DecGeoWidth, and DecGeoChromaFormat refer to the bit-depth of the geometry frame, the height of the geometry frame, the width of the geometry frame, and the chroma format of the geometry frame. The decoded geometry frame may include a plurality of geometry maps (geometry frames with projections of different depths) and mapIdx is used to distinguish between the maps. In DecGeoFrames, compIdx=0 may be set.

The attribute decoder 305 decodes attribute data encoded using VVC, HEVC, or the like and outputs an attribute frame DecAttrFrames[attrIdx][partIdx][mapIdx][frameIdx][compIdx][y][x]. Here, DecAttrFrames, frameIdx, attrIdx, partIdx, mapIdx, compIdx, y, and x respectively indicate a decoded attribute frame, a frame ID, an attribute ID, a partition ID, a map ID, a component ID, a row index, and a column index. DecAttrBitDepth, DecAttrHeight, DecAttrWidth, and DecAttrChromaFormat indicate the bit-depth of the attribute frame, the height of the attribute frame, the width of the attribute frame, and the chroma format of the attribute frame. The decoded attribute frame may include a plurality of attribute maps (attribute frames with projections of different depths) and mapIdx is used to distinguish between the maps. The decoded attribute frame includes a plurality of attributes such as color (R, G, B), reflection, alpha, and normal direction. A plurality of attributes can be transmitted through a plurality of pieces of attribute data and attrIdx is used to distinguish them. For example, {R, G, B} is attribute data 0 (attrIdx=0), {reflection} is attribute data 1 (attrIdx=1), and {alpha} is attribute data 2 (attrIdx=2). An attribute can be divided into and transmitted in a plurality of bitstreams and partIdx is used to distinguish between them. mapIdx is as described above.

The post-decoding converter 308 receives the decoded atlas information, the decoded occupancy frame DecOccFrames, the decoded geometry frame DecGeoFrames, and the decoded attribute frame DecAttrFrames and converts them into nominal formats. The post-decoding converter 308 outputs OccFramesNF[frameIdx][CompTimeIdx][y][x], GeoFramesNF[mapIdx][CompTimeIdx][frameIdx][y][x], AttrFramesNF[attrIdx][mapIdx][CompTimeIdx][compIdx][y][x] which are the nominal formats of the occupancy frame, the geometry frame, and the attribute frame. Here, frameIdx, CompTimeIdx, y, x, mapIdx, attrIdx, and compIdx respectively indicate a frame ID, a composition time index, a row index, a column index, a map ID, an attribute ID, and a component ID.

A nominal format refers collectively to a nominal bit-depth, resolution, chroma format, and composition time index into which a decoded video is to be converted.

Each video sub-bitstream and each region of a packed video sub-bitstream are associated with a nominal bit-depth. This is an expected target bit-depth for all operations for reconstruction. The nominal bit-depth OccBitDepthNF of the occupancy bit-depth is set to oi_occupancy_2d_bit_depth_minus1[ConvAtlasID]+1 or pin_occupancy_2d_bit_depth_minus1[ConvAtlasID]+1. oi_occupancy_2d_bit_depth_minus1[j]+1 indicates a nominal 2D bit-depth into which an occupancy frame of an atlas with atlasID=j is to be converted. pin_occupancy_2d_bit_depth_minus1[j]+1 indicates a nominal 2D bit-depth into which a decoded region including occupancy data of the atlas with atlasID=j is to be converted. In a case that a pin_occupancy_present_flag[j] is equal to 0, it indicates that the packed video frame of the atlas with atlasID=j does not include a region having occupancy data. In a case that the pin_occupancy_present_flag[j] is equal to 1, it indicates that the packed video frame of the atlas with atlasID=j includes a region having occupancy data. In a case that pin_occupancy_present_flag[j] is not present, it is inferred that its value is equal to 0. In a case that a pin_geometry_present_flag[ConvAtlasID] is equal to 1, the nominal bit-depth GeoBitDepthNF of each geometry frame is set to gi_geometry_2d_bit_depth_minus1[ConvAtlasID]+1 or pin_geometry_2d_bit_depth_minus1[ConvAtlasID]+1. gi_geometry_2d_bit_depth_minus1[j]+1 indicates a nominal 2D bit-depth into which all geometry frames of the atlas with atlasID=j are to be converted. pin_geometry_2d_bit_depth_minus1[j]+1 indicates a nominal 2D bit-depth into which a decoded region including geometry data of the atlas with atlasID=j is to be converted. pin_geometry_present_flag[j]=0 indicates that the packed video frame of the atlas with atlasID=j does not include a region having geometry data. pin_geometry_present_flag[j]=1 indicates that the packed video frame of the atlas with atlasID=j includes a region having geometry data. In a case that pin_geometry_present_flag[j] is not present, it is inferred that its value is equal to 0. Finally, in a case that pin_attribute_present_flag[ConvAtlasID]=1, the nominal bit-depth AttrBitDepthNF[attrIdx] of each attribute frame with an attrIdx is set to ai_attribute_2d_bit_depth_minus1[ConvAtlasID][attrIdx]+1 or pin_attribute_2d_bit_depth_minus1[ConvAtlasID][attrIdx]. ai_attribute_2d_bit_depth_minus1[j][i] plus 1 indicates a nominal two-dimensional bit-depth into which all attribute frames with attrIdx=i are to be converted for the atlas with atlasID=j. pin_attribute_2d_bit_depth_minus1[j][i] plus 1 indicates a nominal two-dimensional bit-depth into which a region including an attribute with attrIdx=i is to be converted for the atlas with atlasID=j. pin_attribute_present_flag[j]=0 indicates that the packed video frame of the atlas with atlasID=j does not include a region of attribute data. pin_attribute_present_flag[j]=1 indicates that the packed video frame of the atlas with atlasID=j includes a region of attribute data.

The ConvAtlasID is set equal to a vuh_atlas_id or is determined by external means in a case that no V3C unit header is available. The vuh_atlas_id is indicated by a V3C unit header such as V3C_AD, V3C_OVD, V3C_GVD, or V3C_AVD and specifies the ID of an atlas corresponding to the current V3C unit.

An asps_frame_width represents the frame width of the atlas as an integer number of samples which correspond to luma samples of a video component. It is a requirement for V3C bitstream conformance that the asps_frame_width be equal to the value of vps_frame_width[j] (where j is the current atlas ID). An asps_frame_height indicates the frame height of the atlas as an integer number of samples which correspond to luma samples of a video component. It is a requirement for V3C bitstream conformance that the value of asps_frame_height be equal to the value of vps_frame_height[j], where j indicates the current atlas ID. The nominal frame resolution of an auxiliary video component is defined by the nominal width and height specified respectively by variables Aux VideoWidthNF and Aux VideoHeightNF. Aux Video WidthNF and Aux VideoHeightNF are obtained from an auxiliary video sub-bitstream relating to the atlas.

The nominal chroma format is defined as 4:4:4.

The functions of the post-decoding converter 308 include bit-depth conversion, resolution conversion, output order conversion, atlas composition alignment, atlas dimension alignment, chroma upsampling, geometry map synthesis, and attribute map synthesis. Video frames provided by the V3C decoder 309 may require additional processing steps before being input to the reconstruction process. Such processing steps may include converting a decoded frame into a nominal format (e.g., a nominal resolution, bit-depth, or chroma format). Nominal format information is signaled in a V3C VPS.

The pre-reconstructor 310 may receive the decoded atlas information, the decoded occupancy frame, the decoded geometry frame, and the decoded attribute frame and refine/modify them. Specifically, in a case that an occupancy synthesis flag os_method_type[k] is equal to 1 indicating patch border filtering, the pre-reconstructor 310 starts occupancy synthesis with an OccFramesNF[compTimeIdx][0] and a GeoFramesNF[0][compTimeIdx][0] as inputs and a corrected array OccFramesNF[compTimeIdx][0] as an output. OccFramesNF indicates an occupancy frame decoded in a nominal format and GeoFramesNF indicates a geometry frame decoded in a nominal format. compTimeIdx is a composition time index.

The refiner 306 refines an occupancy, a geometry, and an attribute in units of frames in the pre-reconstructor 310. The refinement may be filtering that receives any of an occupancy, a geometry, and an attribute and outputs any of an occupancy, a geometry, and an attribute. The refiner 306 may perform refinement processing using a two-dimensional occupancy, geometry, and attribute at the same time.

The refiner 306 may further include an NN filter 611 or an ALF 610 and perform filter processing based on received neural network parameters or linear parameters.

The reconstructor 311 receives atlas information, an occupancy, and a geometry and reconstructs the positions and attributes of a point cloud or the vertices of a mesh in 3D space. The reconstructor 311 reconstructs mesh or point cloud data of 3D data based on the reconstructed geometry information (for example, recPcGeo) and attribute information (for example, recPcAttr). Specifically, the reconstructor 311 receives OccFramesNF[compTimeIdx][0][y][x], GeoFramesNF[mapIdx][compTimeIdx][0][y][x] and AttrFramesNF[attrIdx][mapIdx][compTimeIdx][ch][y][x] which are the nominal video frames derived by the pre-reconstructor 310 and reconstructs mesh or point cloud data of 3D data. AttrFramesNF indicates an attribute frame decoded in a nominal format. The reconstructor 311 derives a variable pointCnt as the number of points in a reconstructed point cloud frame, a one-dimensional array pointToPatch[pointCnt] as a patch index corresponding to each reconstructed point, and a two-dimensional array pointToPixel[pointCnt][dimIdx] as atlas coordinates corresponding to each reconstructed point. The reconstructor 311 also derives a 2D array recPcGeo[pointCnt][dimIdx] as a list of coordinates corresponding to each reconstruction point and a 3D array recPcAttr[pointCnt][attrIdx][compIdx] as an attribute relating to the points in the reconstructed point cloud frame. Here, pointCnt, attrIdx, and compIdx correspond respectively to the reconstructed point size, attribute frame ID, and component ID. dimIdx represents the (x,y) component of each reconstructed point.

Specifically, the reconstructor 311 derives recPcGeo and recPcAttr as follows.

```
m = 0
for (k=0; k<3; k++) {
   for(pointIdx=0; pointIdx<AtlasPatchRawPoints[pIdx]; pointIdx++) {
      y = AtlasPatch2dPosY[pIdx] + (m / AtlasPatch2dSizeX[pIdx])
      x = AtlasPatch2dPosX[pIdx] + (m % AtlasPatch2dSizeX[pIdx])
      rawPos1D[m] = gFrame[mapIdx][y][x]
      m++
   }
}
for(pointIdx=0; pointIdx<AtlasPatchRawPoints[pIdx]; pointIdx++) {
   recPcGeo[pointCnt][0] = rawPos1D[pointIdx] + AtlasPatch3dOffsetU[pIdx]
   recPcGeo[pointCnt][1] = rawPos1D[pointIdx + AtlasPatchRawPoints[pIdx]] + Atla
sPatch3dOffsetV[pIdx]
   recPcGeo[pointCnt][2] = rawPos1D[pointIdx + 2 * AtlasPatchRawPoints[pIdx]] +
AtlasPatch3dOffsetD[pIdx]
   y = AtlasPatch2dPosY[pIdx] + (pointIdx / AtlasPatch2dSizeX[pIdx])
   x = AtlasPatch2dPosX[pIdx] + (pointIdx % AtlasPatch2dSizeX[pIdx])
   for(attrIdx=0; attrIdx<ai_attribute_count[RecAtlasID]; attrIdx++) {
      attrDim = ai_attribute_dimension_minus1[RecAtlasID][attrIdx] + 1
      for(compIdx=0; compIdx<attrDim; compIdx++) {
```

-continued

```
        recPcAttr[pointCnt][attrIdx][compIdx] = aFrame[attrIdx][compIdx][y][x]
      }
    }
    if(ai__attribute__count[RecAtlasID]>0) { attrPresent[pointCnt] = 1
    }
    pointToPixel[pointCnt][0] = −1
    pointToPixel[pointCnt][1] = −1
    pointToPatch[pointCnt] = pIdx
    pointCnt++
}
```

Here, pIdx is the index of a patch. compTimeIdx represents a composition time index, rawPos1D represents a one-dimensional position, and gFrame and aFrame represent a geometry frame and an attribute frame, respectively. TilePatch3dOffsetU is a tile patch parameter relating to the patch. ai_attribute_count[j] indicates the number of attributes relating to the atlas with atlasID=j. AtlasPatch3dOffsetU, AtlasPatch3dOffsetV, and AtlasPatch3dOffsetD are parameters indicating the position of the 3D bounding box of FIG. 3A on the 3D model.

```
  for(k=0; k<3; k++) {
  for(pointIdx=0; pointIdx<AtlasPatchRawPoints[pIdx]; pointIdx++) {
    y = AtlasPatch2dPosY[pIdx] + (m / AtlasPatch2dSizeX[pIdx])
    x = AtlasPatch2dPosX[pIdx] + (m % AtlasPatch2dSizeX[pIdx])
    rawPos1D[m] = gFrame[mapIdx][y][x]
    m++
  }
}
```

Here, AtlasPatchRawPoints, AtlasPatch2dPosX, AtlasPatch2dPosY, AtlasPatch2dSizeX, and AtlasPatch2dSizeY are patch information that the atlas decoder 302 derives from the atlas information.

Arrays oFrame[y][x], gFrame[mapIdx][y][x], and aFrame [mapIdx][attrIdx][compTimeIdx][y][x] are derived as follows:

```
for(j=0; j<asps__frame__height; j++) {
  for(i=0; i<asps__frame__width; i++) {
    oFrame[j][i] = OccFramesNF[compTimeIdx][0][j][i]
    for(m=0; m<asps__map__count__minus1+1; m++) {
      gFrame[m][j][i] = GeoFramesNF[m][compTimeIdx)[0][j][i]
      for(a=0; a<ai__attribute__count[RecAtlasID]; a++) {
        for(c=0; c<ai__attribute__dimension__minus1[RecAtlasID][a]+1; c++) {
          aFrame[m][a][c][j][i] = AttrFramesNF[a][m][compTimeIdx][c][j][i]
        }
      }
    }
  }
}
```

Here, ai_attribute_dimension_minus1+1 indicates the total number of dimensions (i.e., the number of channels) of attributes signaled in a V3C VPS and decoded by the V3C unit decoder 301. asps_map_count_minus1+1 indicates the number of maps used to encode geometry data and attribute data of the current atlas. RecAtlasID indicates a decoded atlas ID.

The post-reconstructor 312 changes (updates) the mesh or point cloud data of 3D data that has been processed by the reconstructor 311. The post-reconstructor 312 receives pointCnt as the number of reconstructed points of the current point cloud frame relating to the current atlas, a one-dimensional array attrBitDepth[ ] as a nominal bit-depth, oFrame[ ][ ], recPcGeo[ ][ ], and recPcAttr[ ][ ][ ] and applies geometric smoothing to them and outputs the changed recPcGeo[ ][ ] and recPcAttr[ ][ ][ ].

Refiner 306

Figure 6:
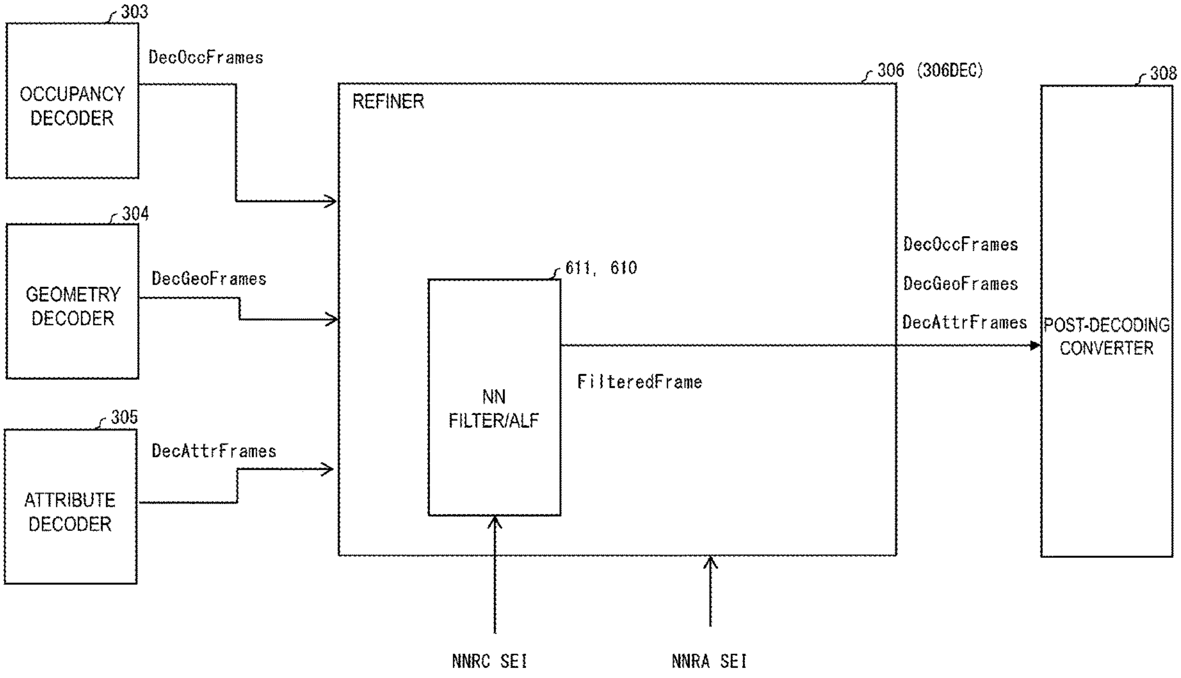
FIG. 6 is a functional block diagram illustrating a configuration of a refiner 306.

FIG. 6 is a functional block diagram illustrating a configuration of the refiner 306 (306DEC).

The refiner 306 (306DEC) applies refinement to DecOccFrames, DecGeoFrames, and DecAttrFrames that have been decoded by the occupancy decoder 303, the geometry decoder 304, and the attribute decoder 305 and will be converted by the post-decoding converter 308. Then, the refined DecOccFrames, DecGeoFrames, and DecAttrFrames are output to the post-decoding converter 308.

The refiner 306 receives DecOccFrames[0][frameIdx][y][x], DecGeoFrames[mapIdx][frameIdx][0][y][x] for each mapIdx and frameIdx, and/or DecAttrFrames[attrIdx][partIdx][mapIdx][frameIdx][compIdx][y][x] for each attrIdx, partIdx, mapIdx, frameIdx, and compIdx according to the refinement target information and outputs the corrected DecOccFrames, DecGeoFrames, and/or DecAttrFrames. The refiner 306 stores the output in DecOccFrames [0][frameIdx][y][x], DecGeoFrames[mapIdx][frameIdx][0][y][x], and/or DecAttrFrames[attrIdx][partIdx][mapIdx][frameIdx][compIdx][y][x] according to the refinement target information.

The refiner 306 may perform refinement processing on a two-dimensional array oFrame of asps_frame_heightxasps_frame_width, a two-dimensional array gFrame of asps_frame_heightxasps_frame_width, and/or a three-dimensional array aFrame of (ai_attribute_dimension_minus1 [RecAtlasID][attrIdx]+1). At this time, the refiner 306 may also receive oFrame=DecOccFrames[0][frameIdx], gFrame=DecGeoFrames[mapIdx][frameIdx][0], and/or aFrame=DecAttrFrames[attrIdx][partIdx][mapIdx] [frameIdx]. Here, the attrIdx and mapIdx may be values nnrc_attribute_index and nnrc_map_index obtained by decoding the NNRC SEI. That is, attrIdx=nnrc_attribute_index and mapIdx=nnra_map_index. The frameIdx may be a compTimeIdx which is a composition time index.

Also, the attrIdx and mapIdx may be values nnra_attribute_index and nnra_map_index obtained by decoding the NNRA SEI. That is, attrIdx=nnra_attribute_index, mapIdx=nnra_map_index. The same is applied below.

According to the above configuration, a network model to be applied (filter characteristics) is specified by characteristics SEI and any of an occupancy, a geometry, and an attribute is specified using refinement target information specified in the characteristics SEI, and refinement processing is applied to a plurality of inputs at the same time, thereby achieving the advantage of improving image quality.

FIG. 7 illustrates an example in which the refiner 306 applies refinement to image signals (video signals) in a nominal format.

Figure 8:
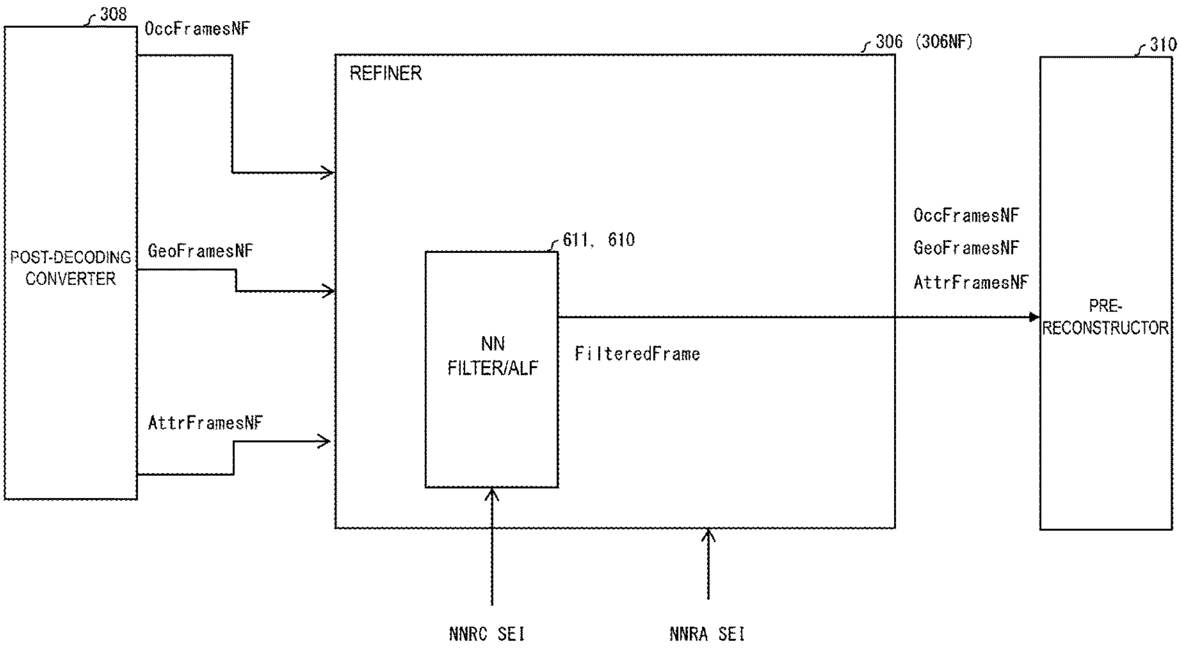
FIG. 8 is a functional block diagram illustrating a configuration of the refiner 306.

FIG. 8 is a functional block diagram illustrating a configuration of the refiner 306 (306NF). The refiner 306 (306NF) applies refinement to each of OccFramesNF, GeoFramesNF, and AttrFramesNF in nominal formats obtained through conversion by the post-decoding converter 308 according to refinement target information and outputs the OccFramesNF, GeoFramesNF, and AttrFramesNF to which refinement has been applied to the pre-reconstructor 310. The processing of the refiner 306 will be described below. The processing of the refiner 306DEC is performed with OccFramesNF, GeoFramesNF, and AttrFramesNF replaced by DecOccFrames, DecGeoFrames, and DecAttrFrames of FIG. 6.

The refiner 306 may perform refinement processing on a two-dimensional array oFrame of asps_frame_heightxasps_frame_width, a two-dimensional array gFrame of asps_frame_heightxasps_frame_width, and/or a three-dimensional array aFrame of (ai_attribute_dimension_minus1 [RecAtlasID][attrIdx]+1). At this time, the refiner 306 may also receive oFrame=OccFramesNF[compTimeIdx][0], gFrame=GeoFramesNF[mapIdx][compTimeIdx][frameIdx] [0], and/or aFrame=AttrFramesNF[attrIdx][mapIdx][compTimeIdx].

Figure 10A:
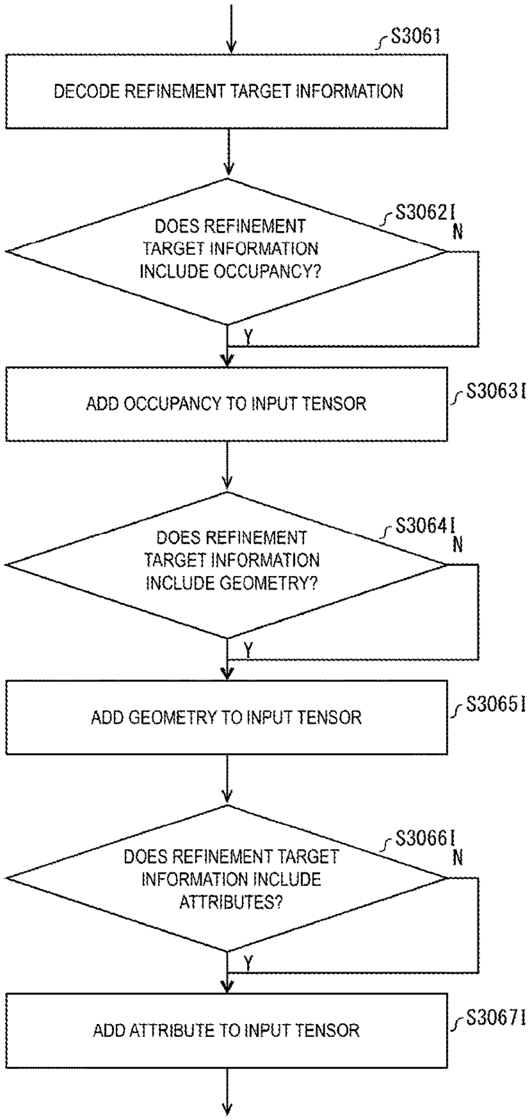
FIGS. 10A and 10B are flowcharts illustrating operations of the refiner 306.

In FIG. 10A, in a case that the refinement target information indicates an occupancy (S3062I), an occupancy is added to the input tensor (S3063I). For example, the following (Equation IN-OCC) may be used.

```
ch = 0
if (OccupancyUsedFlag) { (Equation IN-OCC)
  inputTensor[ch][yP+overlapSize][xP+overlapSize] = Inp(oFrame[yP][xP])
  ch++
}
```

In a case that the refinement target information indicates a geometry (S3064I), a geometry is added to the input tensor (S3065I). For example, the following (Equation IN-GEO) may be used.

```
if (GeometryUsedFlag) { (Equation IN-GEO)
  inputTensor[ch][yP+overlapSize][xP+overlapSize] = Inp(gFrame[yP][xP])
  ch++
}
```

In a case that the refinement target information indicates an attribute (S3066I), an attribute is added to the input tensor (S3067I). For example, the following (Equation IN-ATTR) may be used.

```
if (AttributeUsedFlag) { (Equation IN-ATTR)   inputTensor[ch][yP+overlapSiz
e][xP+overlapSize] = Inp(aFrame[0][yP][xP])   ch++
  inputTensor[ch][yP+overlapSize][xP+overlapSize] = Inp(aFrame[1][yP][xP]);
ch++
  inputTensor[ch][yP+overlapSize][xP+overlapSize] = Inp(aFrame[2][yP][xP]);
ch++
```

According to the above configuration, a network model to be applied (filter characteristics) is specified by characteristics SEI. Any of an occupancy, a geometry, and an attribute is specified using refinement target information specified in the characteristics SEI and refinement processing is applied to a plurality of inputs at the same time, thereby achieving the advantage of improving image quality.

NN Filter 611

The NN filter 611 performs filter processing using a neural network. The neural network is expressed by a neural network model and may include a convolution (Conv).

Here, a neural network model (hereinafter referred to as an NN model) means elements and connection relationships (a topology) of a neural network and parameters (weights and biases) of the neural network. The NN filter 611 may fix the topology and switch only the parameters depending on an image to be filtered. A neural network may include a convolution defined by a kernel size, the number of input channels, and the number of output channels.

Let DecFrame be an input to the refiner 306. The refiner 306 derives an input InputTensor to the NN filter 611 from an input image DecFrame and the NN filter 611 performs filter processing based on the neural network model using the inputTensor to derive an outputTensor. The neural network model used is a model corresponding to an nnra_target_id. The input image may be an image for each component or may be an image having a plurality of components as channels.

The NN filter 611 may repeatedly apply the following process.

The NN filter 611 performs a convolution operation (conv or convolution) on the inputTensor and kernel k[m][n][yy][xx] the same number of times as the number of layers to generate an output image outputTensor to which a bias has been added.

Here, m is the number of channels of inputTensor, n is the number of channels of outputTensor, yy is the height of kernel k, and xx is the width of kernel k.

Each layer generates an outputTensor from an inputTensor.

$$\text{outputTensor[nn][yy][xx]}=\Sigma\Sigma\Sigma(\text{k[mm][nn][i][j]}*\text{inputTensor[mm][yy+j-of][xx+i-of]}+\text{bias[nn]})$$

Here, nn=0 . . . n−1, mm=0 . . . m−1, yy=0 . . . height−1, xx=0 . . . width−1, i=0 . . . yy−1, and j=0 . . . xx−1. "width" is the width of inputTensor and outputTensor and "height" is the height of inputTensor and outputTensor. Σ are the sum over mm=0 . . . m−1, i=0 . . . yy−1, and j=0 . . . xx−1. "of" is the width or height of an area required around the inputTensor to generate the outputTensor.

For 1×1 Conv, 2 is the sum over mm=0 . . . m−1, i=0, and j=0. Here, of=0 is set. For 3×3 Conv, 2 is the sum over mm=0 . . . m−1, i=0 . . . 2, and j=0 . . . 2. Here, of=1 is set.

In a case that the value of yy+j−of is less than 0 or "height" or more or in a case that the value of xx+i−of is less than 0 or "width" or more, the value of inputTensor[mm][yy+j−of][xx+i−of] may be 0. Alternatively, the value of inputTensor[mm][yy+j−of][xx+i−of] may be inputTensor[mm][yclip][xclip]. Here, yclip is max(0, min(yy+j−of, height−1)) and xclip is (0, min(xx+i−of, width−1)).

In the next layer, the obtained outputTensor is used as a new inputTensor and the same process is repeated the same number of times as the number of layers. An activation layer may be provided between layers. Pooling layers or skip connections may be used. A FilteredFrame is derived from the outputTensor finally obtained.

A process called Depth-wise Conv which is represented by the following equation may also be performed using kernel k'[n][yy][xx]. Here, nn=0 . . . n−1, xx=0 . . . width−1, and yy=0 . . . height−1.

$$\text{outputTensor[nn][yy][xx]}=\Sigma\Sigma(\text{k[nn][i][j]}*\text{inputTensor[mm][yy+j-of][xx+i-of]}+\text{bias[nn]})$$

Alternatively, a nonlinear process called Activate, for example ReLU, may be used.

$$\text{ReLU}(x)=x>=0?x:0$$

Alternatively, leakyReLU shown in the following formula may be used.

$$\text{leakyReLU}(x)=x>=0?x:a*x$$

Here, a is a predetermined value less than 1, for example 0.1 or 0.125. To perform integer operations, all values of k, bias, and a described above may be set to integers and a right shift may be performed after conv to generate an outputTensor.

ReLU always outputs 0 for values less than 0 and directly outputs input values of 0 or more. On the other hand, leakyReLU performs linear processing for values less than 0 using a gradient set to a. With ReLU, learning may be difficult to proceed because gradients for values less than 0 are eliminated. leakyReLU leaves a gradient for values less than 0, making such a problem less likely to occur. Among such leakyReLU(x), PRELU in which the value of a is parameterized may be used.

Filter Processing of NN Filter 611

The NN filter 611 derives input data inputTensor[ ][ ][ ] to the NN filter 611 based on one or more of an occupancy frame oFrame, a geometry frame gFrame, and an attribute frame aFrame. The following is an example configuration and a configuration that will be described later may also be used.

```
for(yP = −overlapSize; yP < blockHeight+overlapSize; yP++)
  for(xP = −overlapSize; xP < blockWidth+overlapSize; xP++) {
    yT = cTop + yP
    xT = cLeft + xP
    ch=0
    if (OccupancyUsedFlag) { (Equation IN-OCC)
      inputTensor[ch][yP+overlapSize][xP+overlapSize] = Inp(oFrame[yT][xT])
      ch++
    }
    if (GeometryUsedFlag) { (Equation IN-GEO)
      inputTensor[ch][yP+overlapSize][xP+overlapSize] = Inp(gFrame[yT][xT])
      ch++
    }
    if (AttributeUsedFlag) { (Equation IN-ATTR)
      inputTensor[ch][yP+overlapSize][xP+overlapSize] = Inp(aFrame[0][yT][x
T]); ch++
      inputTensor[ch][yP+overlapSize][xP+overlapSize] = Inp(aFrame[1][yT][x
T]); ch++
      inputTensor[ch](yP+overlapSize][xP+overlapSize] = Inp(aFrame[2][yT][x
T]); ch++
    }
  }
}
if(nnrc__auxiliary__inp__idc == 1) {
  inputTensor[ch][yP+overlapSize][xP+overlapSize] = InpS(nnra__strength__idc)
}
```

An nnra_strength_ide is a parameter that is input to the input tensor and indicates the strength of refinement.

Here,

```
InpSampleVal(y, x, FrameHeight, FrameWidth, targetPic) {
  if(y<0 | | x<0 | | y>=FrameHeight | | x>=FrameWidth) {
    sampleVal = 0
    sampleVal = targetPic[Clip3(0, picHeight−1, y)][Clip3(0,
    picWidth−1, x)]}
  } else {
    sampleVal = targetPic[y][x]
  }
```

may be used to define the following. Inp(oFrame[yT][xT]) may be replaced by Inp(InSampleVal(yT, xT, FrameHeight, Frame Width, oFrame)) that includes picture boundary processing.

Inp(gFrame[yT][xT]) may be replaced by Inp(InSampleVal(yT, xT, FrameHeight, Frame Width, gFrame)) that includes picture boundary processing.

Inp(aFrame[k][yT][xT]) may be replaced by Inp(InSampleVal(yT, xT, FrameHeight, Frame Width, aFrame[k])) that includes picture boundary processing. k=0, 1, 2, . . . . The same is applied below.

Here, overlapSize is the overlap size, for which a value decoded from coded data of characteristics SEI may be used.

The NN filter 611 performs NN filter processing and derives an outputTensor from the inputTensor. Refinement processing (filter processing) indicated by RefineFilter( ) may be performed in units of blocks (blockWidth×blockHeight) as described below.

```
for(cTop=0;cTop<FrameHeight;cTop+=blockHeight)
  for(cLeft=0;cLeft<FrameWidth;cLeft+=blockWidth) {
    DeriveInputTensors( )
    outputTensor=RefineFilter(inputTensor)
    StoreOutputTensors( )
  }
```

Here, DeriveInputTensors( ) is a function indicating input data setting and StoreOutputTensors( ) is a function indicating output data storage. Frame Width and FrameHeight are the size of input data. blockWidth and blockHeight are the width and height of each block. An example of the processing of StoreOutputTensors( ) is shown below.

```
for(yP=0; yP<blockHeight; yP++)
  for(xP=0; xP<blockWidth; xP++) {
    yT = cTop + yP
    xT = cLeft + xP
    if (yT<FrameHeight && xT<FrameWidth)
    ch=0
    if (OccupancyUsedFlag) {
      oFrame[yT][xT]=outputTensor[ch][yP+overlapSize][xP+overlapSize]
      ch++
    }
    if (GeometryUsedFlag) {
      gFrame[yT][xT]=outputTensor[ch][yP+overlapSize][xP+overlapSize]
      ch++
    }
    if (AttributeUsedFlag) {
      aFrame[0][yT][xT]=Out(outputTensor[ch][yP+overlapSize][xP+overlapSize]
); ch++
      aFrame[1][yT][xT]= Out(outputTensor[ch][yP+overlapSize][xP+overlapSiz
e]); ch++
```

-continued

```
    aFrame[2][yT][xT]= Out(outputTensor[ch][yP+overlapSize][xP+overlapSiz
e]); ch++
      }
    }
```

ALF 610

Refinement specified by persistence information of NNRA SEI and an identifier of characteristics SEI may be performed using a filter (a Wiener Filter) that uses a linear model. The linear filter may perform filter processing in the ALF 610. Specifically, a filter target image DecFrame is divided into small regions (x=xSb . . . xSb+bSW−1, y=ySb . . . ySb+bSH−1) of a constant size (for example, 4×4 or 1×1). (xSb, ySb) are the coordinates of the upper left corner of the small region and bSW and bSH are the width and height of the small region. Then, filter processing is performed in units of small regions. A refined image outFrame is derived from the DecFrame using a selected filter coefficient coeff[ ].

outframe[cIdx][*y*][*x*]=Σ(coeff[*i*]*DecFrame[cIdx][*y*+of*y*][*x*+of*x*]>offset))>>shift Here, ofx and ofy are offsets of a reference position determined according to a filter position i. offset=1<<(shift−1). shift is a constant such as 6, 7, or 8 that corresponds to the precision of the filter coefficient.

The image may be classified into small regions and filter processing may be performed by selecting a filter coefficient coeff[classId][ ] according to a classId (=classId[y][x]) of each derived small region.

```
outframe[cIdx][y][x] = (Σ(coeff[classId][1] *
DecFrame[cIdx][y+ofy][x+ofx] + offset) >> shift
```

Here, DecFrame[ch]=inputTensor[ch][yP+overlapSize][xP+overlapSize]. That is, the following may be used.

```
ch=0
if (OccupancyUsedFlag) {
  DecFrame[ch][yP+overlapSize][xP+overlapSize] =
  Out(oFrame[yP][xP]) ch++
}
if (GeometryUsedFlag) {
  DecFrame[ch][yP+overlapSize][xP+overlapSize] =
  Out(gFrame[yP][xP]) ch++
}
if (AttributeUsedFlag) {
  DecFrame[ch][yP+overlapSize][xP+overlapSize] =
Out(aFrame[0][yP][xP]) ; ch++
  DecFrame[ch][yP+overlapSize][xP+overlapSize] =
Out(aFrame[1][yP][xP]) ; ch++
  DecFrame[ch][yP+overlapSize][xP+overlapSize] =
Out(aFrame[2][yP][xP]) ; ch++
}
```

The classId may be derived using an activity level or directionality of a block (one pixel in the case of a 1×1 block). For example, the classId may be derived using the activity level Act derived from a sum of absolute differences or the like as follows.

classId=Act

Act may be derived as follows.

$$Act=\Sigma|x-xi|$$

Here, i=0 . . . 7 and xi indicates a pixel adjacent to a target pixel x. Directions toward adjacent pixels may be eight directions which are directions toward the top, bottom, left and right with respect to i=0 . . . 7 and four diagonal directions at 45 degrees. Act=Σ|−xl+2*x−xr|+Σ|−ya+2*x−yb| may be used. Here, l, r, a, and b are abbreviations for left, right, above, and below, respectively, and indicate pixels on the left, right, top, and bottom of x. Here, Act may be clipped into NumA-1 after being quantized by a shift value as follows.

Act=Min(Num−1,Act>>shift)

Further, the classId may be derived based on the following formula using the directionality D.

classid=Act*$D$*NumA

Here, for example, Act=0 . . . . NumA−1 and D=0 . . . 4.

The ALF 610 directly outputs an OutFrame as a FilteredFrame.

Decoding of Activation SEI and Application of Filter

Figure 9:
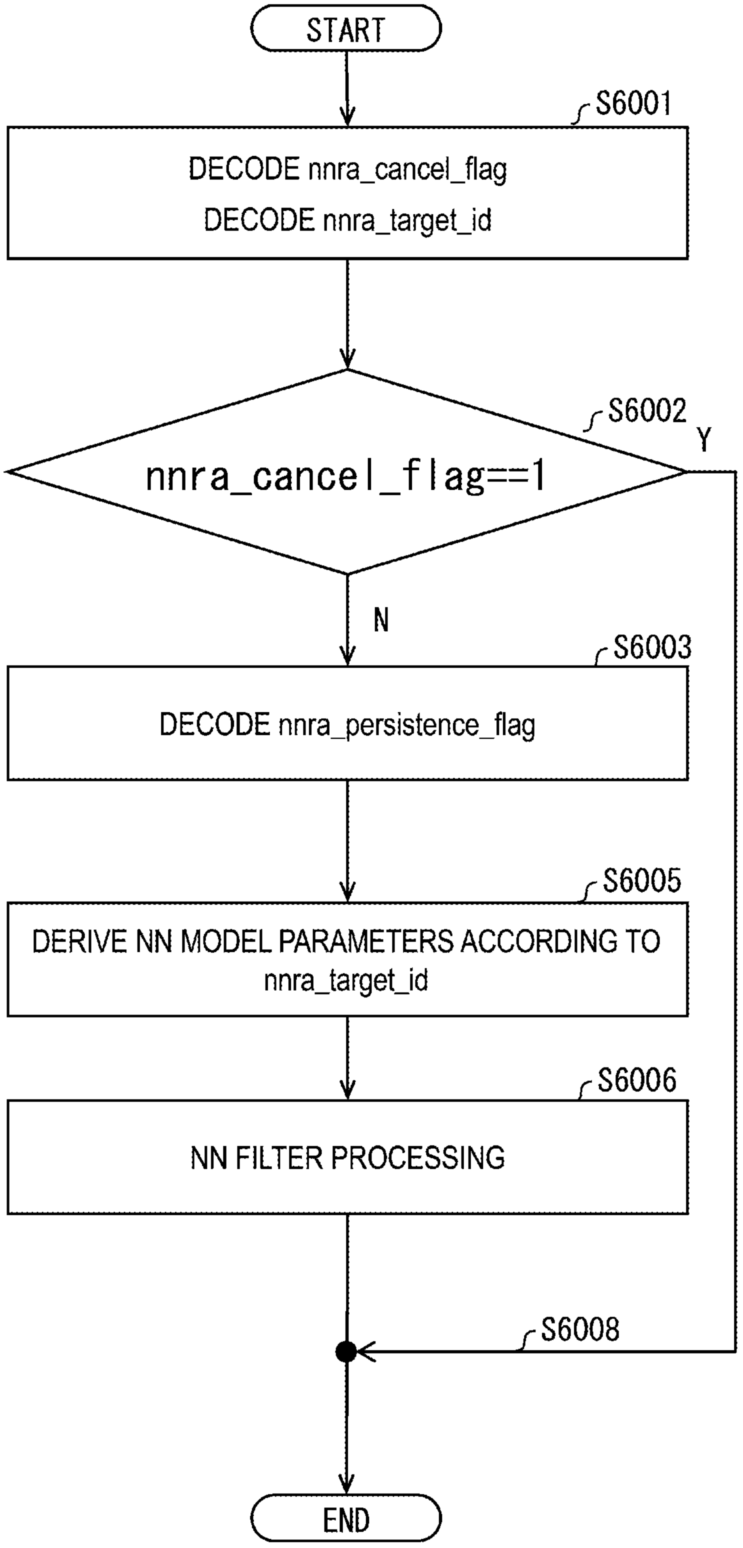
FIG. 9 is a flowchart illustrating an SEI decoding process.

FIG. 9 is a diagram showing a flowchart of a process performed by the 3D data decoding apparatus. The 3D data decoding apparatus performs the following process including decoding of an activation SEI message.

S6001: The atlas decoder 302 decodes an nnra_cancel_flag and an nnra_target_id from activation SEI. The nnra_cancel_flag may also be an nnrc_cancel_flag.

S6002: In a case that the nnra_cancel_flag is 1, the process ends for a frame for which the nnra_cancel_flag is targeted. In a case that the nnra_cancel_flag is 0, the process proceeds to S6003.

S6003: The atlas decoder 302 decodes an nnra_persistence_flag from the activation SEI.

S6005: The atlas decoder 302 identifies characteristics SEI having the same nnrc_id as the nnra_target_id and derive parameters of an NN model from the characteristics SEI.

S6006: The NN filter 611 and the ALF 610 perform refinement (filter) processing using the derived parameters of the NN model.

Example Configurations of Syntax

Neural Network Refinement Characteristics SEI

FIG. 11 shows a syntax of nn_refinement_characteristics (payloadSize) (characteristics SEI). The argument payloadSize represents the number of bytes of this SEI message.

A persistence scope to which the characteristics SEI is applied is a CAS. Namely, characteristics SEI is SEI applied in units of CASs.

A syntax element nnrc_id indicates the ID of the characteristics SEI. In the activation SEI, the value of an nnrc_id of characteristics SEI indicating refinement characteristics to be applied is transmitted as a target ID (an nnra_target_id) to specify refinement processing to be applied.

In a case that an nnrc_mode_idc is 0, it indicates that this SEI message contains an ISO/IEC 15938-17 bitstream and specifies a base NNRE (a neural-network refinement) or specifies an update from a base NNRE having the same nnrc_id value.

In a case that the nnrc_mode_idc is equal to 1 in a case that an NNRC SEI message is the first NNRC SEI message having a specific nnrc_id value within the current CAS in decoding order, a base NNRE regarding that nnrc_id value is identified as a neural network identified by a URI indicated by an nnrc_uri which is a format identified by an nnrc_tag_uri which is a tag URI.

In a case that an NNRC SEI message is neither the first NNRC SEI message having a specific nnrc_id value within the current CAS in decoding order nor a repeat of the first NNRC SEI message in decoding order and the nnrc_mode_idc is 1, it indicates that an update to a base NNRE having the same nnrc_id value is defined by a URI indicated by an nnrc_uri. The nnrc_uri is a format identified by an nnrc_tag_uri which is a tag URI.

The value of nnrc_mode_idc needs to be in a range of 0 to 1 (inclusive) in bitstreams complying with the version.

In a case that this SEI message is the first NNRC SEI message having a specific nnrc_id value within the current CAS in decoding order, the same RefineFilter( ) as that of the base NNRE is assigned.

In a case that this SEI message is neither the first NNRCSEI message having a specific nnrc_id value within the current CAS in decoding order nor a repeat of the first NNRCSEI message in decoding order, an update defined in this SEI message is applied to the base NNRE to obtain a RefineFilter( ).

Updates are not cumulative and each update is applied to the base NNRE. The base NNRE is an NNRE specified in the first NNRC SEI message (in decoding order) having a specific nnrc_id value within the current CAS.

An nnrc_reserved_zero_bit_a needs to be equal to 0 in bitstreams complying with the version. The decoder needs to ignore NNRCSEI messages in which the nnrc_reserved_zero_bit_a is not 0.

An nnrc_tag_uri includes a tag URI having syntax and semantics specified in IET FRFC 4151 that identifies the format and related information of a neural network that is used as a base NNRE having the same nnrc_id value specified in an nnrc_uri or as an update to the base NNRE.

The nnrc_tag_uri being "tag:iso.org, 2023:15938-17" indicates that neural network data identified by the nnrc_uri complies with ISO/IEC15938-17.

An nnrc_uri includes a URI having syntax and semantics specified in IETF Internet Standard 66 that identifies a neural network used as a base NNRE or identifies an update to a base NNRE having the same nnrc_id value.

In a case that an nnrc_property_present_flag is equal to 1, it indicates that syntax elements relating to an input format, an output format, and complexity are present. In a case that the nnrc_property_present_flag is 0, it indicates that no syntax elements relating to an input format, an output format, and complexity are present.

In a case that this SEI message is the first NNRC SEI message having a specific nnrc_id value within the current CAS in decoding order, the nnrc_property_present_flag needs to be equal to 1.

In the case that the nnrc_property_present_flag is equal to 0, it is inferred that the values of all syntax elements which can only exist in the case that the nnrc_property_present_flag is equal to 1 and for which no inferred values are specified are the same as those of corresponding syntax elements in an NNRC SEI message including a base NNRE that is to be updated by this SEI.

The nnrc_base_flag being equal to 1 indicates that the SEI message specifies a base NNRE. The nnrc_base_flag being equal to 0 indicates that the SEI message specifies an update relating to a base NNRE. In a case that no nnrc_base_flag is present, it is inferred that the value of the nnrc_base_flag is equal to 0.

The value of the nnrc_base_flag is subject to the following constraints.

- In a case that an NNRC SEI message is the first NNRC SEI message having a specific nnrc_id value within the current CAS in decoding order, the value of the nnrc_base_flag needs to be equal to 1.
- In a case that an NNRC SEI message nnrcB is not the first NNRC SEI message having a specific nnrc_id value within the current CAS in decoding order and the value of the nnrc_base_flag is equal to 1, the NNRC SEI message is a repeat of the first NNRC SEI message nnrcA having the same nnrc_id in decoding order. That is, the payload content of the next NNRC SEI message nnrcB needs to be the same as that of the NNRC SEI message nnrcA.

In a case that an NNRC SEI message is neither the first NNRC SEI message having a specific nnrc_id value within the current CAS in decoding order nor a repeat of the first NNRC SEI message having the specific nnrc_id value, the following is applied.

- This SEI message defines an update to a preceding base NNRE having the same nnrc_id value in decoding order.
- This SEI message relates to the current decoded picture within the current CAS in output order and all subsequent decoded pictures of layers up to the earlier of a picture at the end of the current CAS or a picture other than decoded pictures that is subsequent to the current decoded picture in output order and is associated with a subsequent NNRC SEI message in decoding order having a specific nnrc_id value within the current CAS.

A syntax element nnrc_input_mode indicates a target of refinement processing (refinement target information). The refinement target information includes at least an attribute. The refinement target information may also include a geometry and an occupancy.

In a case that the nnrc_input_mode indicates that refinement target information includes an attribute, an input channel of an attribute may be specified. An attrID may also be specified. The map ID of a geometry and an attribute may be further specified.

The refinement target information may be one that selects {occupancy, attribute}, one that selects {geometry, attribute}, or one that selects {occupancy, geometry, attribute}. The refinement target information is characterized in that it can select a plurality of refinement targets overlappingly.

FIG. 12 is a diagram showing an example of refinement target information. As shown in FIG. 12, an nnrc_input_mode may indicate whether to refine an occupancy, a geometry, and/or an attribute. "Y" indicates that refinement is performed and "-" indicates that no refinement is performed. In the nnrc_input_mode, the most significant bit indicates an occupancy, the second bit indicates a geometry, and the least significant bit indicates an attribute.

The nnrc_input_mode being "0" indicates that no refinement is performed.

The nnrc_input_mode being "1" indicates that an attribute is refined.

The nnrc_input_mode being "2" indicates that a geometry is refined.

The nnrc_input_mode being "3" indicates that a geometry and an attribute are refined.

The nnrc_input_mode being "4" indicates that an occupancy is refined.

The nnrc_input_mode being "5" indicates that an occupancy and an attribute are refined.

The nnrc_input_mode being "6" indicates that an occupancy and a geometry are refined.

The nnrc_input_mode being "7" indicates that an occupancy, a geometry and an attribute are refined.

&4, &2, and &1 which are bitwise AND operators can be used respectively to determine whether to apply refinement to occupancy, geometry, or attribute as follows.

```
OccupancyUsedFlag = (nnrc__input__mode&4)
GeometryUsedFlag = (nnrc__input__mode&2)
AttributeUsedFlag = (nnrc__input__mode&1)
```

Bit positions are not limited to the above.

```
OccupancyUsedFlag = (nnrc__input__mode&1)
GeometryUsedFlag = (nnrc__input__mode&2)
AttributeUsedFlag = (nnrc__input__mode&4)
```

is also possible.

Without including "no refinement," the nnrc_input_mode can be defined as follows.

The nnrc_input_mode being "0" indicates that an attribute is refined.

The nnrc_input_mode being "1" indicates that a geometry is refined.

The nnrc_input_mode being "2" indicates that a geometry and an attribute are refined.

The nnrc_input_mode being "3" indicates that an occupancy is refined.

The nnrc_input_mode being "4" indicates that an occupancy and an attribute are refined.

The nnrc_input_mode being "5" indicates that an occupancy and a geometry are refined.

The nnrc_input_mode being "6" indicates that an occupancy, a geometry and an attribute are refined.

In this case,

```
OccupancyUsedFlag = (nnrc__input__mode+1)&4
GeometryUsedFlag = (nnrc__input__mode+1)&2
AttributeUsedFlag = (nnrc__input__mode+1)&1
```

A syntax element nnrc_inp_out_format_idc (input/output tensor format information) indicates a method of converting pixel values of the decoded image into input/output values for the refinement processing. In a case that the value of the nnrc_inp_out_format_idc is 0, input values to the refinement processing (especially, the input tensor) are real numbers (floating point values) specified in IEEE754 and a function Inp is specified as follows. The value range of the input tensor is 0 . . . 1.

```
Inp(x)=x÷((1<<BitDepth)−1)
InpS(x) = x
```

In a case that the value of the nnrc_inp_out_format_idc is 1, the input and output values to the refinement processing are unsigned integers and the function Inp is specified as follows. The value range of the input tensor is 0 . . . (1<<inpTensorBitDepth)−1.

```
shift=BitDepth−inpTensorBitDepth
if(inpTensorBitDepth>=BitDepth)
  Inp(x)=x<<(inpTensorBitDepth−BitDepth)
else
  Inp(x)=Clip3(0, (1<<inpTensorBitDepth)−1, (x+(1<<(shift−1)))>>shift)
InpS(x) = x ÷ ((1<<inpTensorBitDepth) − 1)
```

A value obtained by adding 8 to the value of the syntax element nnrc_inp_tensor_bitdepth_minus8 indicates the pixel bit-depth of the luma pixel value of the integer input tensor. The value of the variable inpTensorBitDepth is derived from the syntax element nnrc_inp_tensor_bitdepth_minus8 as follows.

```
inpTensorBitDepth=nnrc_inp_tensor_bitdepth_minus8+8
```

A block is an array of pixels. The refinement processing is performed in units of fixed blocks. A block may also be called a patch.

A syntax element nnrc_block_size_idc indicates the block size. The block size may be a multiple of 64 such as 64, 128, or 192 as follows.

```
blockWidth = 64*nnrc__block__size__idc (=nnrc__block__size__idc<<6)
blockHeight = 64*nnrc__block__size__idc (=nnrc__block__size__idc<<6)
```

The block size may also be defined from the nnrc_block_size_idc excluding 0 as follows.

```
blockWidth = (nnrc__block__size__idc+1)<<6
blockHeight = (nnrc__block__size__idc+1)<<6
```

A syntax element nnrc_overlap_size_idc specifies the number of horizontal and vertical pixels over which adjacent input tensors overlap. The value of nnrc_overlap_size_idc may be a multiple of 4 as follows.

```
overlapSize=nnrc_overlap_size_idc<<
```

A syntax element nnrc_auxiliary_inp_idc indicates whether there is additional data for inputTensor. In a case that the value of nnpfc_auxiliary_inp_idc is 0, there is no additional data, and in a case that the value is greater than 0, additional data is input to inputTensor. The additional data may be a parameter decoded from the NNRA SEI (e.g., an nnra_strength_idc).

A function Out that converts each of a luma pixel value and a chroma pixel value output by post-processing into an integer value of a pixel bit-depth is specified as follows using the pixel bit-depth BitDepth.

```
Out(x)=Clip3(0,(1<<BitDepth)−1,Round(x*((1<<BitDepth)−1)))
```

The function Out is specified as follows.

```
shift=outTensorBitDepth−BitDepth
if(outTensorBitDepth>=BitDepth)
  Out(x)=Clip3(0, (1<<BitDepth)−1, (x+(1<<(shift−1)))>>shift)
else
  Out(x)=x<<(BitDepth−outTensorBitDepth)
```

An nnrc_out_tensor_bitdepth_minus8+8 specifies the pixel bit-depth of pixel values of an integer output tensor. The value of outTensorBitDepth is derived from the syntax element nnrc_out_tensor_bitdepth_minus8 as follows.

```
outTensorBitDepth=nnrc_out_tensor_bitdepth_minus8+8
```

A syntax element nnrc_reserved_zero_bit_b needs to be equal to 0.

A syntax element nnrc_payload_byte[i] contains the i-th byte of an ISO/IEC 15938-17 compliant bitstream. All nnrc_payload_bytes[i] need to be those of an ISO/IEC 15938-17 compliant bitstream.

Figure 10B:
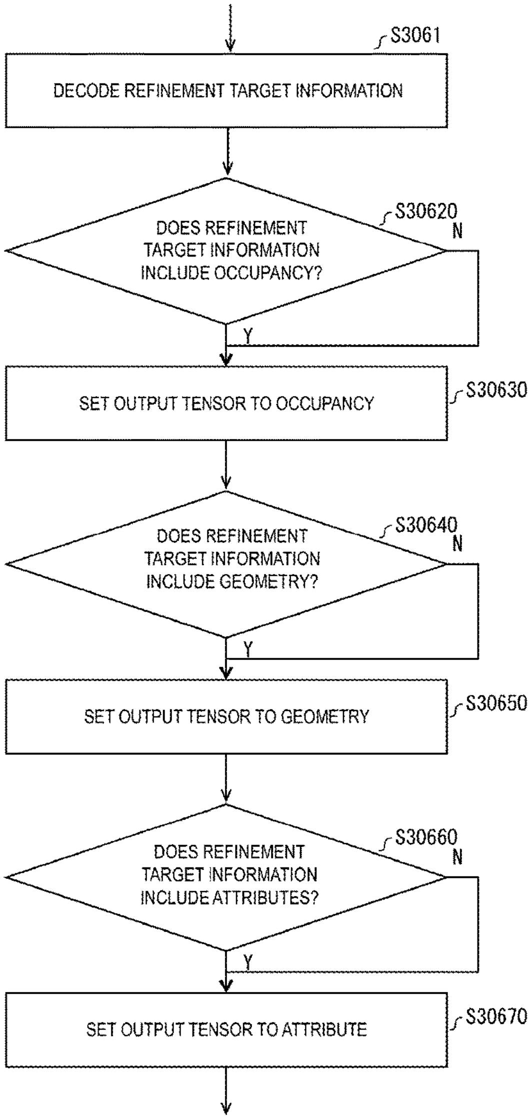

Specification of Input Tensor and Output Tensor According to Refinement Target Information FIGS. 10A and 10B are flowcharts illustrating operations of the refiner 306.

An example illustrated in FIGS. 10A and 10B will be described in further detail.

In FIG. 10A, the refiner 306 or the atlas decoder 302 decodes refinement target information (S3061).

The refiner 306 may derive an inputTensor according to an nnrc_input_mode. Hereinafter, ch indicates the index (position) of a channel to be set. ch++ is an abbreviation for ch=ch+1 and indicates that the index of the channel to be set is increased by 1.

ch=0

In a case that the refinement target information indicates an occupancy (S3062I), an occupancy is added to the input tensor (S3063I). For example, the following (Equation IN-OCC) may be used.

```
if (OccupancyUsedFlag) { (Equation IN-OCC)
  inputTensor[ch][yP+overlapSize][xP+overlapSize] =
  Inp(oFrame[yT][xT]) ch++
}
```

In a case that the refinement target information indicates a geometry (S3064I), a geometry is added to the input tensor (S3065I). For example, the following (Equation IN-GEO) may be used.

```
if (GeometryUsedFlag) { (Equation IN-GEO)
  inputTensor[ch][yP+overlapSize][xP+overlapSize] =
  Inp(gFrame[yT][xT]) ch++
}
```

In a case that the refinement target information indicates an attribute (S3066I), an attribute is added to the input tensor (S3067I). For example, the following (Equation IN-ATTR) may be used.

```
if (AttributeUsedFlag) { (Equation IN-ATTR)
  inputTensor[ch][yP+overlapSize][xP+overlapSize] = Inp(aFrame[0][yT][xT]); c
h++
  inputTensor[ch][yP+overlapSize][xP+overlapSize] = Inp(aFrame[1][yT][xT]); c
h++
  inputTensor[ch][yP+overlapSize][xP+overlapSize] = Inp(aFrame[2][yT][xT]); c
h++
}
```

In FIG. 10B, the refiner 306 may derive (update) an output frame from the outputTensor according to the nnrc_input_mode.

ch=0

In a case that the refinement target information indicates an occupancy (S30620), a specific component of the output tensor may be set to an occupancy (S30630). For example, the following (Equation OUT-OCC) may be used.

```
ch=0
if (OccupancyUsedFlag) {
  oFrame[yP][xP]=outputTensor[ch][yP+overlapSize][xP+overlapSize]
  ch++
}
```

In a case that the refinement target information indicates a geometry (S30640), a specific component of the output tensor is set to a geometry (S30650). For example, the following (Equation OUT-GEO) may be used.

```
if (GeometryUsedFlag) {
  gFrame[yP][xP]=outputTensor[ch][yP+overlapSize][xP+overlapSize)
  ch++
}
```

In a case that the refinement target information indicates an attribute (S30660), a specific component of the output tensor is set to an attribute (S30670). For example, the following (Equation OUT-ATTR) may be used.

```
if (AttributeUsedFlag) {
  aFrame[0][yT][xT]=Out(outputTensor[ch][yP+overlapSize][xP+overlapSize]); ch
++
  aFrame[1][yT][xT]= Out(outputTensor[ch][yP+overlapSize][xP+overlapSize]); c
h++
  aFrame[2][yT][xT]= Out(outputTensor[ch][yP+overlapSize][xP+overlapSize]); c
h++
}
```

In the above, the atlas decoder 302 decodes refinement target information from coded data and the refiner 306 sets an occupancy, a geometry, and/or an attribute in the input tensor using the decoded refinement target information. Further, the refiner 306 performs refinement on the input tensor to obtain an output tensor. An occupancy, a geometry, and/or an attribute are set in the output tensor using the decoded refinement target information. The above configuration can improve efficiency because refinement processing can be performed on a plurality of combinations of occupancies, geometries, and attributes. Also, by decoding refinement target information from coded data, it is possible to set an input and an output of the model with a degree of freedom according to the degree of complexity. Further, the content of refinement can be determined and processing can be performed accordingly.

FIGS. 13A and 13B show a part of a syntax of nn_refinement_characteristics (payloadSize) (characteristics SEI). The characteristics SEI shown in FIG. 13A further includes a syntax element nnrc_attribute_num_minus1 indicating the number of attributes as refinement target information.

The refiner 306 may derive an inputTensor according to the nnrc_input_mode.

ch=0

In a case that the refinement target information indicates an occupancy, an occupancy is added to the input tensor. For example, (Equation IN-OCC) may be used.

In a case that the refinement target information indicates a geometry, a geometry is added to the input tensor. For example, (Equation IN-GEO) may be used.

In a case that the refinement target information indicates an attribute, an attribute is added to the input tensor. For example, the following (Equation IN-ATTR-NUM) may be used.

```
if (AttributeUsedFlag) { (Equation IN-ATTR-NUM)
  for (k=0;k<=nnrc_attribute_num_minus1;k++) {
    inputTensor[ch][yP+overlapSize][xP+overlapSize] = Inp(aFrame[k][yT][xT]); c
h++
  }
}
```

-

Without including nnrc_attribute_num_minus1 as a syntax element of the characteristics SEI, the refiner 306 may use ai_attribute_dimension_minus1[RecAtlasID][attrIdx] obtained by decoding coded data of a V3C VPS. ai_attribute_dimension_minus1=2 may also be used.

```
if (AttributeUsedFlag) {
  for (k=0;k<=ai_attribute_dimension_minus1[RecAtlasID][attrIdx];k++) {
    inputTensor[ch][yP+overlapSize][xP+overlapSize]=Inp(aFrame[k][yT][xT]); c
h++
  }
}
```

The refiner 306 may derive (update) an output frame from the outputTensor according to the nnrc_input_mode.

ch=0

In a case that the refinement target information indicates an occupancy, a specific component of the output tensor is set to an occupancy. For example, (Equation OUT-OCC) may be used.

In a case that the refinement target information indicates a geometry, a geometry is added to the specific component of the output tensor. For example, (Equation OUT-GEO) may be used.

In a case that the refinement target information indicates an attribute, an attribute is added to the specific component of the output tensor. For example, the following (Equation OUT-ATTR-NUM) may be used.

```
if (AttributeUsedFlag) { (Equation OUT-ATTR-NUM)
  for (k=0;k<=nnrc_attribute_num_minus1;k++) {
    aFrame[k][yT][xT]=Out(outputTensor][ch][yP+overlapSize][xP+overlapSize]);
ch++
  }
}
```

In the above, the atlas decoder 302 further decodes the number of attributes from coded data as refinement target information, and using the decoded refinement target information, the refiner 306 selects any of an occupancy, a geometry, and an attribute and sets it in an input tensor. Further, the refiner 306 performs refinement on the input tensor to obtain an output tensor. An occupancy, a geometry, and/or an attribute are set in the obtained output tensor using the decoded refinement target information. Any of an occupancy, a geometry, and an attribute is selected and set in the output tensor. According to the above configuration, the number of attributes to which refinement is to be applied can be changed and the input/output of the model can be set with a degree of freedom according to the degree of complexity.

The characteristics SEI shown in FIG. 13B further includes a syntax element nnrc_attribute_start_pos indicating the start position of an attribute and a syntax element nnrc_attribute_num_minus1 indicating the number of attributes as refinement target information.

The refiner 306 may derive an inputTensor according to the nnrc_input_mode.

```
ch=0
```

In a case that the refinement target information indicates an occupancy, an occupancy is added to the input tensor. For example, (Equation IN-OCC) may be used.

In a case that the refinement target information indicates a geometry, a geometry is added to the input tensor. For example, (Equation IN-GEO) may be used.

In a case that the refinement target information indicates an attribute, an attribute is added to the input tensor. For example, the following (Equation IN-ATTR-POS) may be used.

```
if (AttributeUsedFlag) { (Equation IN-ATTR-POS)
  for (k=nnrc_attribute_start_pos; k<=nnrc_attribute_start_pos+nnrc_attribute
_num_minus1; k++) {
    inputTensor[ch][yP+overlapSize][xP+overlapSize]=Inp(aFrame[k][yT][xT]); c
h++
  }
}
```

Alternatively, the refiner 306 may derive (update) an output frame from the outputTensor according to the nnrc_input_mode.

```
ch=0
```

In a case that the refinement target information indicates an occupancy, a specific component of the output tensor is set to an occupancy. For example, (Equation OUT-OCC) may be used.

In a case that the refinement target information indicates a geometry, a geometry is added to the specific component of the output tensor. For example, (Equation OUT-GEO) may be used.

In a case that the refinement target information indicates an attribute, a specific component of the output tensor is set to an attribute. For example, the following (Equation OUT-ATTR-POS) may be used.

```
if (AttributeUsedFlag) { (Equation OUT-ATTR-POS)
  for (k=nnrc_attribute_start_pos; k<=nnrc_attribute_start_pos+nnrc_attribute
_num_minus1; k++) {
    aFrame[k][yT][xT]=Out(outputTensor[ch][yP+overlapSize][xP+overlapSize]);
ch++
  }
}
```

In the above, the atlas decoder 302 decodes the number of attributes from coded data as refinement target information, and using the refinement target information, the refiner 306 sets an occupancy, a geometry, or an attribute in an input tensor. Further, the refiner 306 performs refinement on the input tensor to obtain an output tensor. The output tensor is set to an occupancy, a geometry, or an attribute using the refinement target information. According to the above configuration, the number of attributes to which refinement is to be applied can be changed and the input/output of the model can be set with a degree of freedom according to the degree of complexity.

FIG. 14 shows a part of a syntax of nn_refinement_characteristics (payloadSize) (characteristics SEI). The characteristics SEI shown in FIG. 14 includes syntax elements nnrc_occupancy_flag, nnrc_geometry_flag, and nnrc_attribute_num as refinement target information. The nnrc_occupancy_flag is a flag indicating whether to refine an occupancy and the nnrc_geometry_flag is a flag indicating whether to refine a geometry. The nnrc_attribute_num is the number of attributes serving as refinement target information and can indicate whether to refine the attributes.

The refiner 306 may use the following settings and perform the processing already described.

```
OccupancyUsedFlag= nnrc_occupancy_flag
GeometryUsedFlags= nnrc_geometry_flag
AttributeUsedFlags= nnrc_attribute_num
```

The characteristics SEI may include an nnrc_attribute_flag and an nnrc_attribute_num_minus1 as syntax elements instead of the nnrc_attribute_num. Here, the nnrc_attribute_flag and the nnrc_attribute_num_minus1 may be decoded instead of the nnrc_attribute_num. The refiner 306 may use the following settings and perform the processing already described.

```
OccupancyUsedFlag= nnrc__occupancy__flag
GeometryUsedFlags= nnrc__geometry__flag
AttributeUsedFlags= nnrc__attribute__flag
```

The refiner 306 may derive an inputTensor according to the refinement target information.

ch=0

In a case that the nnrc_occupancy_flag of the refinement target information is not 0, that is, indicates an occupancy, an occupancy is added to the input tensor. For example, (Equation IN-OCC) may be used.

In a case that the nnrc_geometry_flag of the refinement target information is not 0, that is, indicates a geometry, a geometry is added to the input tensor. For example, (Equation IN-GEO) may be used.

A number of attributes corresponding to the nnrc_attribute_num of the refinement target information are added to the input tensor. For example, the following (Equation IN-ATTR-NUM2) may be used.

```
for (k=0; k<nnrc__attribute__num; k++) { (Equation IN-ATTR-NUM2)
  inputTensor[ch][yP+overlapSize][xP+overlapSize]=Inp(aFrame[compTimeIdx][k][y
T][xT]); ch++
}
```

In a case that nnrc_attribute_num=0, no attribute frames will be added to the inputTensor and thus the case of refining attribute frames (nnrc_attribute_num>0) and the case of not refining attribute frames (nnrc_attribute_num==0) can be controlled by the value of nnrc_attribute_num.

The refiner 306 may derive (update) an output frame from the outputTensor according to the nnrc_input_mode.

ch=0

In a case that the nnrc_occupancy_flag of the refinement target information is not 0, that is, indicates an occupancy, a specific component of the output tensor is set to an occupancy. For example, (Equation OUT-OCC) may be used.

In a case that the nnrc_geometry_flag of the refinement target information is not 0, that is, indicates a geometry, a specific component of the output tensor is set to a geometry. For example, (Equation OUT-GEO) may be used.

Specific components of the output tensor are set to a number of attributes corresponding to the number of nnrc_attribute_num of the refinement target information. For example, the following (Equation OUT-ATTR-NUM2) may be used.

```
for (k=0; k<nnrc__attribute__num; k++) { (Equation OUT-ATTR-NUM2)
  aFrame[k][yT][xT]=Out(outputTensor[ch][yP+overlapSize][xP+overlapSize]);
ch++
}
```

In the above, the atlas decoder 302 sets an input tensor using individual syntax elements for an occupancy, a geometry, and an attribute. Further, the refiner 306 performs refinement on the input tensor to obtain an output tensor. The output tensor is further set to an occupancy, a geometry, and an attribute using the refinement target information.

The refinement target information may further include a syntax element nnrc_attribute_start_pos. The nnrc_attribute_start_pos is a syntax element indicating the start position of an attribute to be refined in FIG. 13B.

A number of attributes corresponding to the nnrc_attribute_num_minus1+1 of the refinement target information are added to the input tensor. For example, the following (Equation IN-ATTR-POS2) may be used.

```
for (k=nnrc__attribute__start__pos; k<=nnrc__attribute__start__pos+nnrc__attribute__n
um__minus1; k++) { (Equation IN-ATTR-POS2)
  inputTensor[ch][+P+overlapSize][xP+overlapSize]=Inp(aFrame[k][yP][xP]); ch+
+
}
```

Specific components of the output tensor are set to a number of attributes corresponding to the number of nnrc_attribute_num_minus1+1 of the refinement target information. For example, the following (Equation OUT-ATTR-POS2) may be used.

```
for (k=nnrc__attribute__num__start__pos; k<=nnrc__attribute__num__start__pos+nnrc__a
ttribute__num__minus1) {
    aFrame[k][yT][xT]=Out(outputTensor[ch][yP+overlapSize][xP+overlapSize]);
ch++
  }
```

FIG. 15 shows a part of a syntax of nn_refinement_characteristics (payloadSize) (characteristics SEI). In a case that the characteristics SEI shown in FIG. 15 includes a geometry and an attribute as refinement target information, the characteristics SEI includes a syntax element nnrc_map_index indicating a map to be refined.

In a case that the refinement target information indicates an occupancy, an occupancy is added to the input tensor. For example, (Equation IN-OCC) may be used.

In a case that the refinement target information indicates a geometry, a geometry indicated by the nnrc_map_index is added to the input tensor. For example, mapIdx=nnrc_map_index is set in (Equation IN-GEO).

In a case that the refinement target information indicates an attribute, an attribute indicated by the nnrc_map_index is added to the input tensor. For example, mapIdx=nnrc_map_index is set in (Equation IN-ATTR), (Equation IN-ATTR-NUM), (Equation IN-ATTR-POS), (Equation IN-ATTR-NUM2), or (Equation IN-ATTR-POS2).

In a case that the refinement target information indicates an occupancy, a specific component of the output tensor may be set to an occupancy. For example, (Equation OUT-OCC) may be used.

In a case that the refinement target information indicates a geometry, a specific component of the output tensor is set to a geometry indicated by the nnrc_map_index. For example, mapIdx=nnrc_map_index is set in (Equation OUT-GEO).

In a case that the refinement target information indicates an attribute, a specific component of the output tensor is set to an attribute indicated by the nnrc_map_index. For example, mapIdx=nnrc_map_index is set in (Equation OUT-ATTR), (Equation OUT-ATTR-NUM), (Equation OUT-ATTR-POS), (Equation OUT-ATTR-NUM2), or (Equation OUT-ATTR-POS2).

In the above, the atlas decoder 302 decodes an nnrc_map_index of a geometry and an attribute to be refined from characteristics SEI to derive an mapIdx. A geometry and an attribute specified by the mapIdx are selected to perform refinement, thus achieving the advantage that it is possible to apply refinement optimized to the specific mapIdx.

Further, in a case that the characteristics SEI includes an attribute as refinement target information, the characteristics SEI may include a syntax element nnrc_attribute_index indicating the attrIdx of a refinement target.

In a case that the refinement target information indicates an attribute, an attribute indicated by the nnrc_attribute_index and the nnrc_map_index is added to the input tensor. For example, mapIdx=nnrc_map_index and attrIdx=nnrc_attribute_index may be set in (Equation IN-ATTR), (Equation IN-ATTR-NUM), (Equation IN-ATTR-POS), (Equation IN-ATTR-NUM2), or (Equation IN-ATTR-POS2).

In a case that the refinement target information indicates an attribute, a specific component of the output tensor is set to an attribute indicated by the nnrc_map_index. For example, mapIdx=nnrc_map_index and attrIdx=nnrc_attribute_index may be set in (Equation OUT-ATTR), (Equation OUT-ATTR-NUM), (Equation OUT-ATTR-POS), (Equation OUT-ATTR-NUM2), or (Equation OUT-ATTR-POS2).

Further, the characteristics SEI may include an nnrc_attribute_partition_index and an nnrc_auxiliary_video_flag. The nnrc_attribute_partition_index is an index indicating a partition of an attribute to be refined and the nnrc_auxiliary_video_flag is a flag indicating auxiliary data to be refined.

In the above, the atlas decoder 302 decodes an nnrc_attribute_index of a geometry and an attribute to be refined from characteristics SEI to derive an attrIdx. An attribute specified by the attrIdx is selected to perform refinement, thus achieving the advantage that it is possible to apply refinement optimized to the specific attrIdx.

Neural Network Refinement Activation SEI

FIG. 16A shows an example configuration of a syntax of activation SEI.

For this activation SEI, the atlas decoder 302 (a refinement information decoder) and an atlas coder 102 (a refinement information coder) decode and encode the following syntax elements.

An nnra_target_id indicates the ID of characteristics SEI to be applied (an identifier or identification information of refinement characteristics information). Refinement processing specified by the characteristics SEI having the same nnrc_id as the nnra_target_id is applied to an image.

An nnra_cancel_flag is a cancel flag. The nnra_cancel_flag being 1 indicates that maintenance of refinement set for the image in already decoded NNRA SEI is to be canceled. The nnra_cancel_flag being 0 indicates that a subsequent syntax element (nnra_persistence_flag) is to be transmitted, encoded, and decoded.

The nnra_persistence_flag indicates persistence information of a target refinement. In a case that the nnra_persistence_flag is 0, it indicates that the target refinement is applied only to pictures indicated by an atlasID. In a case that the nnra_persistence_flag is 1, it indicates that the target refinement indicated by the nnra_target_id is applied to the current picture and all subsequent pictures until one of the following conditions is met.

A new CAS starts;

A bitstream ends; and

An NNRA SEI message with nnra_cancel_flag=1 is output following the current picture in output order. That is, the maintenance is canceled by nnra_cancel_flag=1.

The following condition may also be used.

An NNRA SEI message with nnra_cancel_flag=1 and having the same nnra_target_id as the current SEI message is output following the current picture in output order. That is, the maintenance is canceled by nnra_cancel_flag=1.

FIG. 16B shows an example configuration of a syntax of activation SEI. The atlas decoder 302 and the atlas coder 102 decode and encode a syntax element indicating second refinement target information. The second refinement target information includes an nnra_map_index indicating a mapIdx to which refinement is to be applied, an nnra_attribute_index indicating an attrIdx to which refinement is to be applied, an nnra_attribute_partition_index indicating a partIdx to which refinement is to be applied, and an nnra_auxiliary_video_flag indicating whether the target to which refinement is to be applied is auxiliary data.

In a case that the refinement target information indicates an occupancy, an occupancy is added to the input tensor. For example, (Equation IN-OCC) may be used.

In a case that the refinement target information indicates a geometry, a geometry indicated by the second refinement target information nnra_map_index is added to the input tensor. For example, mapIdx=nnra_map_index may be set in (Equation IN-GEO).

In a case that the refinement target information indicates an attribute, an attribute indicated by the second refinement target information nnra_map_index is added to the input tensor. For example, mapIdx=nnra_map_index may be set in (Equation IN-ATTR), (Equation IN-ATTR-NUM), (Equation IN-ATTR-POS), (Equation IN-ATTR-NUM2), or (Equation IN-ATTR-POS2).

In a case that the refinement target information indicates an occupancy, a specific component of the output tensor may be set to an occupancy. For example, (Equation OUT-OCC) may be used.

In a case that the refinement target information indicates a geometry, a specific component of the output tensor is set to a geometry indicated by the second refinement target information nnra_map_index. For example, mapIdx=nnra_map_index may be set in (Equation OUT-GEO).

In a case that the refinement target information indicates an attribute, a specific component of the output tensor is set to an attribute indicated by the second refinement target information nnra_map_index. For example, mapIdx=nnra_map_index may be set in (Equation OUT-ATTR), (Equation OUT-ATTR-NUM), (Equation OUT-ATTR-POS), (Equation OUT-ATTR-NUM2), or (Equation OUT-ATTR-POS2).

In the above, the atlas decoder 302 decodes an nnra_map_index of a geometry and an attribute to be refined from activation SEI to derive an mapIdx. A geometry and an attribute specified by the mapIdx of the activation SEI are selected to perform refinement, thus achieving the advantage that it is possible to apply refinement optimized to the specific mapIdx. Further, refinement specified by the same characteristics SEI can be applied to geometries and attributes indicated by an mapIdx having the same value. Refinements specified by different pieces of characteristics SEI can be applied to geometries and attributes indicated by different mapIdxs at the same time.

Further, in a case that an attribute is included as refinement target information, a syntax element nnra_attribute_index indicating an attrId of a refinement target may be included.

In a case that the refinement target information indicates an attribute, an attribute indicated by the second refinement target information nnra_attribute_index and nnra_map_index is added to the input tensor. For example, mapIdx=nnra_map_index and attrIdx=nnra_attribute_index may be set in (Equation IN-ATTR), (Equation IN-ATTR-NUM), (Equation IN-ATTR-POS), (Equation IN-ATTR-NUM2), or (Equation IN-ATTR-POS2).

In a case that the refinement target information indicates an attribute, a specific component of the output tensor is set to an attribute indicated by the second refinement target information nnra_map_index and nnra_attribute_index. For example, mapIdx=nnra_map_index and attrIdx=nnra_attribute_index may be set in (Equation OUT-ATTR), (Equation OUT-ATTR-NUM), (Equation OUT-ATTR-POS), (Equation OUT-ATTR-NUM2), or (Equation OUT-ATTR-POS2).

An nnrc_attribute_partition_index and an nnrc_auxiliary_video_flag may be further included.

In the above, the atlas decoder 302 decodes an nnra_attribute_index of a geometry and an attribute to be refined from activation SEI to derive an attrIdx. An attribute specified by the attrIdx is selected to perform refinement. This achieves the advantage that it is possible to apply refinement optimized to the specific attrIdx. Further, refinement specified by the same characteristics SEI can be applied to attributes indicated by an attrIdx having the same value. Refinements specified by different pieces of characteristics SEI can be applied to attributes indicated by different attrIdxs at the same time.

FIG. 19 shows an example configuration of a syntax of activation SEI. Here, the activation SEI includes the number of attributes nnra_attribute_count and the number of maps minus 1 (nnra_map_count_minus1) as syntax elements. The activation SEI also includes an nnra_target_id[i][j] indicating the id of characteristics SEI indicating NNRE applied to each attribute attrIdx=i and map mapIdx=j. The activation SEI may also include an nnra_enabled_flag[i][j], an nnra_cancel_flag[i][j], and an nnra_persistent_flag[i][j] indicating whether refinement is applied to each attribute attrIdx=i and map mapIdx=j. The activation SEI may also include an nnra_strength_present_flag[i][j].

In a case that the refinement target information indicates an attribute, an attribute indicated by i and j is added to the input tensor. For example, mapIdx=i and attrIdx=j may be set in (Equation IN-ATTR), (Equation IN-ATTR-NUM), (Equation IN-ATTR-POS), (Equation IN-ATTR-NUM2), or (Equation IN-ATTR-POS2).

In a case that the refinement target information indicates an attribute, a specific component of the output tensor is set to an attribute indicated by i and j. For example, mapIdx=i and attrIdx=j may be set in (Equation OUT-ATTR), (Equation OUT-ATTR-NUM), (Equation OUT-ATTR-POS), (Equation OUT-ATTR-NUM2), or (Equation OUT-ATTR-POS2).

Configuration of 3D Data Coding Apparatus

Figure 17:
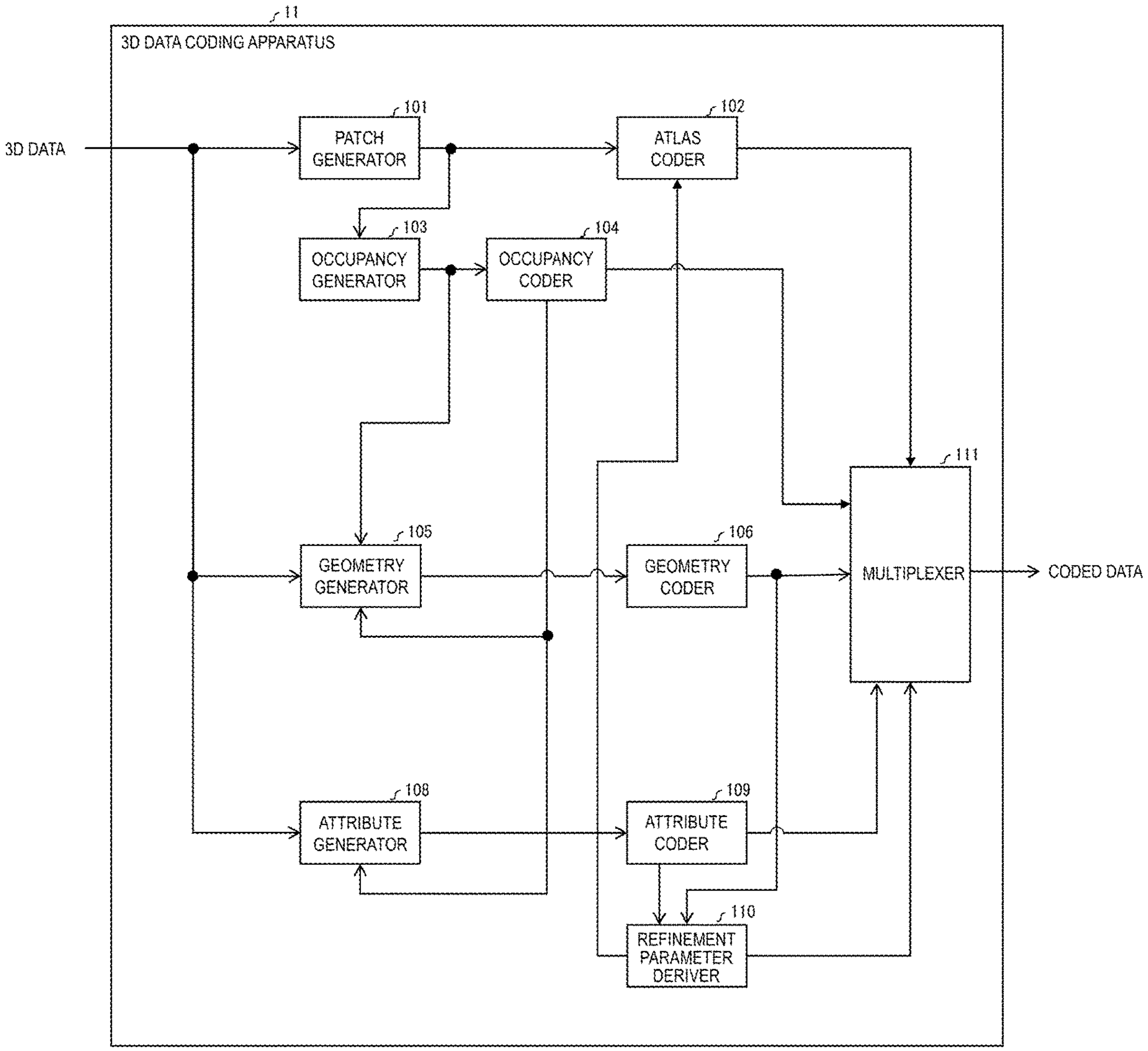
FIG. 17 is a functional block diagram illustrating a schematic configuration of a 3D data coding apparatus 11 according to an embodiment of the present invention.

FIG. 17 is a functional block diagram illustrating a schematic configuration of the 3D data coding apparatus 11 according to an embodiment of the present invention.

The 3D data coding apparatus 11 includes a patch generator 101, an atlas coder 102, an occupancy generator 103, an occupancy coder 104, a geometry generator 105, a geometry coder 106, an attribute generator 108, an attribute coder 109, a refinement parameter deriver 110, and a multiplexer 111. The 3D data coding apparatus 11 receives a point cloud or a mesh as 3D data and outputs coded data.

The patch generator 101 receives 3D data and generates and outputs a set of patches (here, rectangular images). Specifically, 3D data is divided into a plurality of regions and each region is projected onto one plane of a 3D bounding box set in 3D space to generate a plurality of patches. The patch generator 101 outputs information regarding the 3D bounding box (such as coordinates and sizes) and information regarding mapping to the projection planes (such as the projection planes, coordinates, sizes, and presence or absence of rotation of each patch) as atlas information.

The atlas coder 102 encodes the atlas information output from the patch generator 101 and outputs atlas data.

The occupancy generator 103 receives the set of patches output from the patch generator 101 and generates an occupancy that represents valid areas of patches (areas where 3D data exists) as a 2D binary image (e.g., with 1 for a valid area and 0 for an invalid area). Here, other values such as 255 and 0 may be used for a valid area and an invalid area.

The occupancy coder 104 receives the occupancy output from the occupancy generator 103 and outputs an occupancy and occupancy data. VVC, HEVC, or the like is used as a coding scheme.

The geometry generator 105 generates a geometry frame that stores depth values for the projection planes of patches based on the 3D data, the occupancy, the occupancy data, and the atlas information. The geometry generator 105 derives a point with the smallest depth to the projection plane among points that are projected onto pixels g(x, y) as p_min(x, y, z). The geometry image generator 105 also derives a point with the maximum depth among points that are projected onto pixel g(x, y) and located at a predetermined distance d from p_min(x, y, z) as p_max(x, y, z). A geometry frame obtained by projecting p_min(x, y, z) on all pixels onto the projection plane is set as a geometry frame of a Near layer. A geometry frame obtained by projecting p_max(x, y, z) on all pixels onto the projection plane is set as a geometry frame of a Far layer.

The geometry coder 106 receives a geometry frame and outputs a geometry frame and geometry data. VVC, HEVC, or the like is used as a coding scheme.

The attribute generator 108 generates an attribute frame that stores color information (e.g., YUV values and RGB values) for the projection plane of each patch based on the 3D data, the occupancy, the geometry frame, and the atlas information. The attribute generator 108 obtains a value of an attribute corresponding to the point p_min(x, y, z) with the minimum depth calculated by the geometry generator 105 and sets an attribute frame onto which the value is projected as an attribute frame of the Near layer. An attribute frame similarly obtained for p_max(x, y, z) is set as an attribute frame of the Far layer.

The attribute coder 109 receives an attribute frame and outputs an attribute and attribute data. VVC, HEVC, or the like is used as a coding scheme.

The refinement parameter deriver 110 receives the attribute frame and the original attribute frame or the geometry frame and the original geometry frame and selects or derives optimal filter parameters for NN filter processing and outputs the optimal filter parameters. The refinement parameter deriver 110 sets values such as an nnra_target_id, an nnra_cancel_flag, and an nnra_persistance_flag in the SEI.

The multiplexer 111 receives the filter parameters output from the refinement parameter deriver 110 and outputs them in a predetermined format. Examples of the predetermined format include SEI which is supplemental enhancement information of video data, an ASPS and an AFPS which are data structure specification information in the V3C standard, and an ISOBMFF which is a media file format. The multiplexer 111 multiplexes the atlas data, the occupancy data, the geometry data, the attribute data, and the filter parameters and outputs the multiplexed data as coded data. A byte stream format, the ISOBMFF, or the like is used as a multiplexing method.

Figure 18:
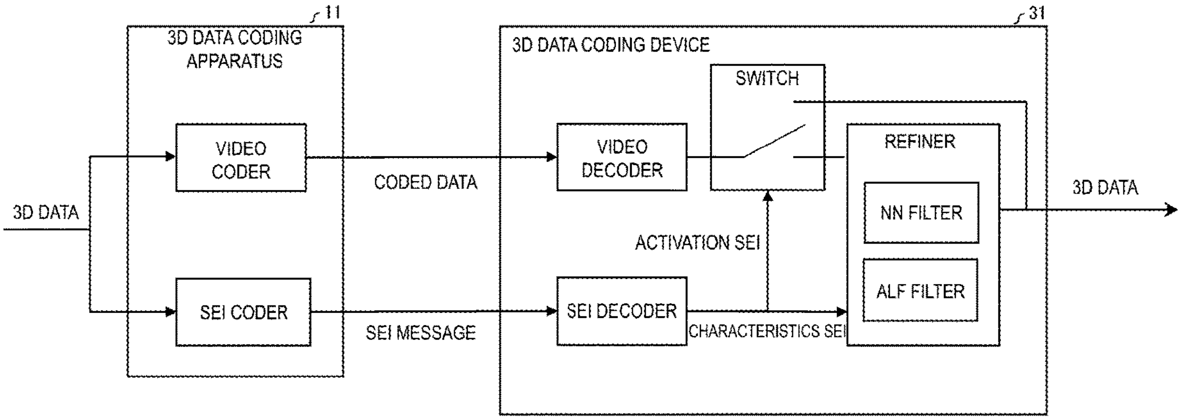
FIG. 18 is a block diagram illustrating a relationship between the 3D data coding apparatus, the 3D data decoding apparatus, and an SEI message according to an embodiment of the present invention.

FIG. 18 is a block diagram illustrating a relationship between the 3D data coding apparatus 11, the 3D data decoding apparatus 31, and an SEI message according to an embodiment of the present invention.

The 3D data coding apparatus 11 includes a video coder and an SEI coder. In the configuration of FIG. 17, the video coder corresponds to the occupancy coder 104, the geometry coder 106, and the attribute coder 109. In the configuration of FIG. 17, the SEI coder corresponds to the atlas coder 102.

The 3D data decoding apparatus 31 includes a video decoder, an SEI decoder, a switch, and a refiner. The video decoder corresponds to the occupancy decoder 303, the geometry decoder 304, and the attribute decoder 305 in the configuration of FIG. 5. The SEI decoder corresponds to the atlas decoder 302 in the configuration of FIG. 5. The refiner corresponds to the refiner 306 in the configuration of FIG. 5. The refiner 306 may include either or both of the NN filter 611 or the ALF 610.

The video coder encodes an occupancy, a geometry frame, and an attribute frame generated from 3D data. The video decoder decodes the coded data to reconstruct a decoded image. The SEI coder generates characteristics SEI and activation SEI from the 3D data. The SEI decoder decodes these SEI messages. The activation SEI is input to a switch to specify an image to be refined and only the image to be refined is input to the refiner. The characteristics SEI is input to the refiner to specify refinement to be applied to the decoded image. The refined image or decoded image is displayed on the 3D data display apparatus 41 (FIG. 1).

Although embodiments of the present invention have been described above in detail with reference to the drawings, the specific configurations thereof are not limited to those described above and various design changes or the like can be made without departing from the spirit of the invention.

Embodiments of the present invention are not limited to those described above and various changes can be made within the scope indicated by the claims. That is, embodiments obtained by combining technical means appropriately modified within the scope indicated by the claims are also included in the technical scope of the present invention.

INDUSTRIAL APPLICABILITY

Embodiments of the present invention are suitably applicable to a 3D data decoding apparatus that decodes coded data into which 3D data has been encoded and a 3D data coding apparatus that generates coded data into which 3D data has been encoded. The present invention is also suitably applicable to a data structure for coded data generated by a 3D data coding apparatus and referenced by a 3D data decoding apparatus.

REFERENCE SIGNS LIST

- 11 3D data coding apparatus
- 101 Patch generator
- 102 Atlas coder
- 103 Occupancy generator
- 104 Occupancy coder
- 105 Geometry generator
- 106 Geometry coder
- 108 Attribute generator
- 109 Attribute coder
- 110 Refinement parameter deriver
- 111 Multiplexer
- 21 Network
- 31 3D data decoding apparatus
- 301 Header decoder

302 Atlas information decoder
303 Occupancy decoder
304 Geometry decoder
306 Geometry reconstructor
307 Attribute decoder
308 Refiner
309 V3C decoder
310 Pre-reconstructor
311 Reconstructor
41 3D data display apparatus

The invention claimed is:

1. A three-dimensional (3D) data decoding apparatus for decoding coded data, including an occupancy, a geometry, and an attribute, converted from 3D data, the 3D data decoding apparatus comprising:

a refinement information decoder configured to decode characteristics information of refinement and activation information of refinement from the coded data;

an occupancy decoder configured to decode an occupancy frame from the coded data;

a geometry decoder configured to decode a geometry frame from the coded data;

an attribute decoder configured to decode an attribute frame from the coded data; and a refiner configured to perform refinement processing of the attribute frame or the geometry frame, wherein:

the refinement information decoder is further configured to decode refinement information indicating whether each of the occupancy, the geometry, and the attribute is to be used from coded data of the characteristics information for an input tensor, and the refiner is configured to perform the refinement processing using images selected from the occupancy frame, the geometry frame, or the attribute frame, wherein the images are specified according to the refinement information.

2. The 3D data decoding apparatus according to claim 1, wherein the refinement information decoder is further configured to decode a number of attributes to be applied as the refinement information in a case that the refinement information indicates that the attribute is to be used and the refiner is configured to perform the refinement processing using a specified number of attributes.

3. The 3D data decoding apparatus according to claim 1, wherein the refinement information decoder is further configured to individually decode a syntax element indicating whether to use the occupancy, the geometry, or the attribute as the refinement information, and in a case that the occupancy, the geometry, or the attribute has been specified, the refiner is configured to perform the refinement processing using the specified occupancy, geometry, or attribute.

4. The 3D data decoding apparatus according to claim 1, wherein the refinement information decoder is further configured to decode information indicating a map identifier (ID) to be applied from the characteristics information, and the refiner is configured to perform the refinement processing on a specified map ID.

5. The 3D data decoding apparatus according to claim 4, wherein the refinement information decoder is further configured to decode the information indicating the map ID to be applied in a case that the refinement information indicates that the geometry or the attribute is to be used.

6. The 3D data decoding apparatus according to claim 4, wherein the refinement information decoder is further configured to decode information indicating an attribute index, a partition index, and an auxiliary flag to be applied in a case that the refinement information indicates that the attribute is to be used.

7. The 3D data decoding apparatus according to claim 1, wherein the refinement information decoder is further configured to decode an index indicating the characteristics information, a cancel flag, and a persistence flag as the activation information.

8. The 3D data decoding apparatus according to claim 1, wherein the refinement information decoder is further configured to decode information indicating a map identifier (ID) to be applied as the activation information, and the refiner is configured to perform the refinement processing using a geometry or an attribute specified by the map ID.

9. The 3D data decoding apparatus according to claim 1, wherein the refinement information decoder is further configured to decode information indicating an attribute to be applied as the activation information, and the refiner is configured to perform the refinement processing using the attribute indicated by the information.

10. A three-dimensional (3D) data coding apparatus for encoding 3D data including an occupancy, a geometry, and an attribute into coded data, the 3D data coding apparatus comprising:

a refinement information coder configured to encode characteristics information of refinement and activation information of neural network refinement;

an occupancy coder configured to encode an occupancy frame;

a geometry coder configured to encode a geometry frame;

an attribute coder configured to encode an attribute frame; and a refiner configured to perform refinement processing of the attribute frame or the geometry frame, wherein:

the refinement information coder is further configured to encode refinement information indicating whether each of the occupancy, the geometry, or the attribute is to be used into coded data of the characteristics information for an input tensor, and the refiner is configured to perform the refinement processing using, as input, images selected from the occupancy frame, the geometry frame, or the attribute frame, wherein the images are specified according to the refinement information.

* * * * *